United States Patent
St. John Herbert, III

(10) Patent No.: US 6,366,917 B1
(45) Date of Patent: *Apr. 2, 2002

(54) METHOD OF MODIFYING A POPULATED DATABASE STRUCTURE BY MODIFYING METADATA DESCRIBING THE DATABASE STRUCTURE

(75) Inventor: Charles St. John Herbert, III, Los Altos, CA (US)

(73) Assignee: WebPutty, Inc., Los Altos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,876

(22) Filed: Apr. 1, 1998

(51) Int. Cl.[7] ................................................. B06F 17/30
(52) U.S. Cl. ......................................... 707/100; 717/11
(58) Field of Search ............................... 707/100–104; 717/11; 709/217–229

(56) References Cited

U.S. PATENT DOCUMENTS

| | | | |
|---|---|---|---|
| 4,627,019 A | 12/1986 | Ng | 364/900 |
| 4,742,467 A | 5/1988 | Messerich et al. | 364/200 |
| 4,774,661 A | 9/1988 | Kumpati | 364/300 |
| 4,791,561 A | 12/1988 | Huber | 364/300 |
| 4,805,099 A | 2/1989 | Huber | 364/300 |
| 4,819,160 A | 4/1989 | Tanka et al. | 364/300 |
| 4,833,597 A | 5/1989 | Wakayama et al. | 364/200 |
| 4,979,109 A | 12/1990 | Tanaka et al. | 364/200 |
| 5,185,887 A | 2/1993 | Takahashi et al. | 395/600 |
| 5,341,498 A * | 8/1994 | Connor et al. | 707/104 |
| 5,455,945 A * | 10/1995 | VanderDrift | 707/2 |
| 5,806,075 A * | 9/1998 | Jain et al. | 707/201 |
| 5,862,325 A * | 1/1999 | Reed et al. | 707/10 |
| 5,899,998 A * | 5/1999 | McGauley et al. | 707/104 |
| 5,920,725 A | 7/1999 | Ma et al. | 717/11 |
| 6,018,742 A * | 1/2000 | Hebert, III | 707/102 |
| 6,151,624 A * | 11/2000 | Teare et al. | 707/217 |
| 6,185,584 B1 | 2/2001 | Paik et al. | 707/511 |

OTHER PUBLICATIONS

C. A. Schneider, "Table Update Serialization Technique", *IBM Technique Disclosure Bulletin*, vol. 21, No. 3, Aug. 1978, pp. 1158–1162.

Frank W. Allen, Mary E. S. Loomis and Michael V. Mannino, "The Integrated Dictionary/Directory System", *ACM Computing Surveys*, vol. 14, No. 2, Jun. 1982, pp. 245–286.

Batchelor, Dimmick and Rees, "Automatic Data Base Dictionary Creation and Maintenance During Program Creation or Modification", *IBM Technical Disclosure Bulletin*, vol. 26, No. 5, Oct. 1983, pp. 2466–2475.

* cited by examiner

Primary Examiner—Hosain T. Alam
Assistant Examiner—Jean Bolte Fleurantin
(74) Attorney, Agent, or Firm—Blakely, Sokoloff, Taylor & Zafman LLP

(57) ABSTRACT

A method of modifying a database structure requires firstly modifying metadata that describes the relevant database structure. Thereafter, the relevant database structure is automatically modified to conform to the modified metadata. The step of modifying the metadata comprises modifying a description of a database object characteristic in a metadata object.

50 Claims, 35 Drawing Sheets

COLUMN TYPE DEFINITIONS

| COLUMN TYPE | DATA TYPE | DATA LENGTH |
|---|---|---|
| AMOUNT | N | 15 |
| C10 | C | 10 |
| C15 | C | 15 |
| C2 | C | 2 |
| C3 | C | 3 |
| C40 | C | 40 |
| C5 | C | 5 |
| C50 | C | 50 |
| CONVERSION | N | 12 |
| CURRENCY | C | 3 |
| DATATYPE | C | 20 |
| DATE | D | 8 |
| DATETIME | D | 16 |
| DESCRIPTION | C | 255 |
| FACTOR | N | 16 |
| FLAG | C | 1 |
| ID | N | 10 |
| INT | N | 10 |
| LENGTH | N | 5 |
| LINT | N | 10 |
| N1 | N | 1 |
| N2 | N | 2 |
| N3 | N | 3 |
| N4 | N | 4 |
| NAME | C | 50 |
| OPERAMT | N | 16 |
| QUANTITY | N | 16 |
| SEQUENCE | N | 10 |
| SMALLINT | N | 5 |
| U1 | C | 1 |
| U10 | C | 10 |
| U2 | C | 2 |
| U20 | C | 20 |
| U25 | C | 25 |
| U255 | C | 255 |
| U3 | C | 3 |
| U30 | C | 30 |
| U4 | C | 4 |
| U40 | C | 40 |
| U8 | C | 8 |

EDIT COLUMN TYPE DEFINITION

[ DELETE ]

| | | |
|---|---|---|
| COLUMN TYPE: | AMOUNT | —102a |
| DATA TYPE | NUMERIC ▽ | —102b |
| DATA LENGTH: | 15 | —102c |
| MINIMUM LENGTH: | 0 | —102d |
| ALLOW NEGATIVES | | —102e |
| NUMBER PRECISION: | 15 | —102f |
| ORACLE8 DATA TYPE: | NUMBER (16, 4) | —102g |
| SCALE: | 4 | —102h |
| SQL SERVER 6.5 DATA TYPE: | MONEY | —102i |
| SUFFIX FLAG | | —102j |
| UPPERCASE FLAG | | —102k |

[ RESET ] [OK]

FIG. 8

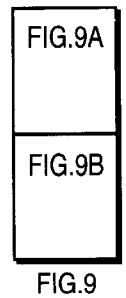

FIG.9

COLUMN DEFINITIONS

| CODE | COLUMN | DESCRIPTION | TYPE |
|---|---|---|---|
| ABBR | ABBREVIATION | ABBREVIATION VALUE | V20 |
| ABSENCETYPE | ABSENCE TYPE | ABSENCETYPE | U1 |
| ACCEPTED_QUANTITY | ACCEPTED QUANTITY | ACCEPTED QUANTITY | QUANTITY |
| ACCEPTED_UOM | ACCEPTED QUANTITY UNIT OF MEASURE | ACCEPTED QUANTITY UNIT OF MEASURE | UOM |
| ACCEPTED_UOM_ID | ACCEPTED QUANTITY UNIT OF MEASURE | ACCEPTED QUANTITY UNIT OF MEASURE | ID |
| ACCOUNTING_DATETIME | ACCOUNTING DATE AND TIME | ACCOUNTING DATE AND TIME | DATETIME |
| ACCTPERIOD | ACCOUNTING PERIOD | IS THE ACCOUNTING PERIOD THE DOCUMENT IS TO POST WITHIN. THE PERIOD IS WITHIN A FISCAL YEAR TO WHICH A BUSINESS TRANSACTION IS ASSIGNED. | N2 |

FIG.9A

| ACCTTYPE | ACCOUNT TYPE | IS AN ACCOUNT CLASSIFICATION THAT SPECIFIES THE USE OF THIS ACCOUNT. SUGGESTED EXAMPLES OF ACCOUNT TYPE ARE: ASSET, EQUITY, EXPENSE, LIABILITY, REVENUE. | U1 |
|---|---|---|---|
| ACCTYEAR | ACCOUNTING YEAR | IS THE ACCOUNTING YEAR THE DOCUMENT IS TO POST WITHIN. GENERALLY A PERIOD OF 12 MONTHS FOR WHICH THE COMPANY REGULARLY HAS TO CREAT FINANCIAL STATEMENTS. A FISCAL YEAR MAY CORRESPOND TO A CALENDAR YEAR. | N4 |
| ACKCODE | ACKNOWLEDGE-MENT | REPRESENTS A LIST OF CODES THAT SPECIFY STATUS VALUES FOR THE ACKNOWLEDGEMENT. VALID CODES ARE: ACCEPTED, MODIFIED, REJECTED. SYNONYMS: ORDER STATUS, ORDER DISPOSITION | C10 |

FIG. 9B

EDIT COLUMN DEFINITION

[DELETE] [COPY]

| COLUMN CODE: | ABBR ▽ | 106a |
|---|---|---|
| DESCRIPTION: | ABBREVIATION VALUE | 106b |
| PROMPT: | ABBREVIATION | 106c |
| COLUMN TYPE: | V20 ▽ | 106d |
| DEFAULT VALUE: | | 106e |
| DEFAULTING PROCEDURE: | NONE ▽ | 106f |
| VALIDATION PROCEDURE: | NONE ▽ | 106g |
| FOREIGN KEY TABLE: | NONE ▽ | 106h |
| MAX OCCURRENCES: | 1 | 106i |
| OAG FLAG: | | 106j |

[RESET] [OK]

FIG. 10

TABLE DEFINITIONS

| TABLE | DATA TYPE |
|---|---|
| ADDRESSES | A CENTRAL DEFINITION OF ALL ADDRESSES |
| BUSINESS_PARTNERS | BUSINESS PARTNERS; BOTH CUSTOMERS AND SUPPLIERS |
| BUYERS | BUYERS |
| CODES | CODES; VALID VALUES RELATED TO COLUMNS |
| COLUMN_TYPES | COLUMN TYPES, CONTAINS DATA TYPE, MIN AND MAX LENGTH, ETC. |
| COLUMNS | COLUMN DEFINITIONS, INCLUDING COLUMN TYPE AND FOREIGN KEY RELATIONSHIPS |
| COUNTRIES | ISO COUNTRY CODE DEFINITIONS |
| CURRENCIES | ISO CURRENCY DEFINITIONS |
| INSTALL | A SINGLE ROW TABLE CONTAINING INSTALLATION DIRECTORIES |
| INVENTORY | INVENTORY CONTROL TABLE |
| INVENTORY_HISTORY | HISTORY OF INVENTORY TRANSACTIONS |
| ITEM_PROPERTIES | PROPERTIES OR CHARACTERISTICS OF AN ITEM |
| ITEMS | ITEM (PART) DEFINITIONS |
| LANGUAGES | ISO AND MICROSOFT LANGUAGE DEFINITIONS |
| LOGINS | PRESENT AND HISTORICAL USER LOGINS |
| LOTLEVELS | LOTS - LEVELS 1 AND 2 |
| MESSAGE_LOG | LOG OF ALL MESSAGES GENERATED |
| MESSAGES | THE DEFINITION AND TEXT OF ALL MESSAGES |
| NAMES | A CENTRAL REPOSITORY OF VARIOUS NAMES |
| ORG_STRUCTURE | ORGANIZATIONAL HIERARCHY, BUILT FROM THE ORGS TABLE |
| ORGS | ORGANIZATIONAL DEFINITIONS |
| PLANNERS | PLANNERS |
| PROCEDURE_ARGUMENTS | THE ARGUMENT LIST FOR DEFINED PROCEDURES |
| PROCEDURE_TABLES | THE LIST OF TABLES UPDATED BY GENERATED PROCEDURES |
| PROCEDURES | DEFINITION OF STORED PROCEDURES BY PROCEDURE TYPE |

FIG. 11A

| | |
|---|---|
| PURCHASE_ORDER_LINES | PURCHASE ORDER LINES |
| PURCHASE_ORDER_SUBLINES | PURCHASE ORDER SUB LINES |
| PURCHASE_ORDERS | PURCHASE ORDER HEADERS |
| SALES_ORDER_LINES | SALES ORDER LINES |
| SALES_ORDERS | SALES ORDER HEADERS |
| SALESPEOPLE | SALES PEOPLE |
| SCREEN_ITEMS | A LIST OF ITEMS WITHINN A SCREEN TEMPLATE |
| SCREEN_TEMPLATES | A SCREEN DEFINITION |
| SCREEN_VIEWS | A LIST OF VIEWS ACCESSED WITHIN A SCREEN |
| SEGMENT_COLUMNS | THE COLUMNS WITHIN OAGIS SEGMENTS |
| SEGMENT_QUALIFIERS | THE QUALIFIERS WITHIN OAGIS SEGMENTS |
| SEGMENTS | OAGIS SEGMENTS |
| SITELEVEL_STRUCTURE | SITE LEVEL STRUCTURE |
| SITELEVELS | PHYSICAL SITES OR LOCATIONS |

FIG.11B

EDIT TABLE DEFINITION

[ DELETE ]

| | | |
|---|---|---|
| CODE: | ADDRESSES | ⟋110a |
| MODIFIED SINCE LAST GENERATION: | NO | ⟋110b |
| VERSION: | 7 | ⟋110c |
| CREATE INSERT ROUTINE: | | ⟋110d |
| CREATE UPDATE ROUTINE: | | ⟋110e |
| CREATE DELETE ROUTINE: | | ⟋110f |
| TRANSACTION LOGGING: | LOG EVERYTHING ▼ | ⟋110g |
| DESCRIPTION: | A CENTRAL DEFINITION OF ALL ADDRESSES. | ⟋110h |
| TABLE COLUMNS: | MANAGE TABLE COLUMN DEFINITIONS | ⟋110i |
| UNIQUE KEYS: | MANAGE UNIQUE KEY DEFINITIONS | ⟋110j |

[ RESET ] [OK]

FIG. 12

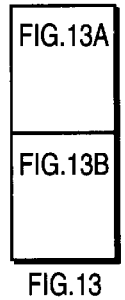

FIG. 13

TABLE COLUMN DEFINITIONS FOR TABLE ITEMS

112

| BACK TO TABLE DEFINITION | | NEW TABLE COLUMN DEFINITION... |
|---|---|---|
| ACTIONS | COLUMN | DESCRIPTION |
| EDIT DELETE | AVGRUNSIZE_QUANTITY | AVERAGE RUN SIZE QUANTITY |
| EDIT DELETE | AVGRUNSIZE_UOM_ID | AVERAGE RUN SIZE QUANTITY UNIT OF MEASURE |
| EDIT DELETE | BOMID | BILL OF MATERIAL IDENTIFICATION CODE IS AN IDENTIFICATION CODE FOR A SPECIFIC BILL OF MATERIALS |
| EDIT DELETE | BOMREVISION | BOMREVISION IS THE REVISION NUMBER OR IDENTIFIER OF THE BILL OF MATERIALS |
| EDIT DELETE | COMMODITY | COMMODITY GROUP ARE CODES THAT IDENTIFY USER-DEFINED GROUPINGS OF ITEMS |
| EDIT DELETE | DESCRIPTN | DESCRIPTION IDENTIFIER IS A FREE-FORM DESCRIPTION OF THE TRANSACTION OR ANY PORTION OF THE TRANSACTION |
| EDIT DELETE | DRAWING | IDENTIFIES AN ENGINEERING DRAWING OR SPECIFICATION DEFINED BY THE BUYER. SYNONYM: BLUEPRINT, PARTS EXPLOSION |
| EDIT DELETE | EFFECTIVE_DATETIME | EFFECTIVE DATE AND TIME |
| EDIT DELETE | GLENTITYS | IS THE PRIMARY BALANCING SEGMENT OF THE GL ACCOUNT STRUCTURE. TYPICALLY, THIS IS THE OWNING ENTITY FOR THE TRANSACTION. P & L STATEMENTS ARE REQUIRED AT THIS LEVEL. SYNONYMS: BUSINESS UNIT, FUND, G/L COMPANY, ETC. |

FIG. 13A

| | | | |
|---|---|---|---|
| EDIT | DELETE | GLNOMACCT | "IS AN ENTRY IN THE GL CHART OF ACCOUNTS.IT IS THE ""WHAT"", NOT THE ""WHO"" OR ""WHERE"". EXAMPLES INCLUDE: ASSETS, OFFICE SUPPLIES, REVENUES, SALARIES, TRAVEL, SYNONYMS: ACCOUNT NUMBER, GL NATURAL ACCOUNT, ETC." |
| EDIT | DELETE | HAZRDMATL | HAZARDOUS MATERIAL CODE IDENTIFIES THE HAZARDOUS MATERIAL CODE FOR THE PRODUCT. VALID VALUES ARE DEFINED BY ISO. |
| EDIT | DELETE | ID | ID |
| EDIT | DELETE | ITEM | CONTAINS THE IDENTIFIER OF A PRODUCT OR SUBSTANCE THAT IS BOUGHT, SOLD, MANUFACTURED, DELIVERED, OR IS SOMEHOW HANDLED IN SIMILAR BUSINESS PROCESSES. SYNONYMS: MATERIAL, PART, RESOURCE ,STOCK KEEPING UNIT (SKU). |
| EDIT | DELETE | ITEMCLASS | ITEM CLASSIFICATION |
| EDIT | DELETE | ITEMDEFN | ITEM DEFINITION IS THE EXTENDED DESCRIPTION OF AN ITEM |
| EDIT | DELETE | ITEMDESC | ITEM DESCRIPTION CONTAINS THE ITEM DESCRIPTION |
| EDIT | DELETE | ITEMRV | IS THE REVISION CODE FOR AN ITEM. IT IS COMMONLY USED TO INDICATE ENGINEERING CHANGES TO THE ITEM OR PRODUCT. SYNONYMS: PRODUCT REVISION, ENGINEERING CHANGE NUMBER (ECN) |

FIG. 13B

EDIT TABLE COLUMN DEFINITION FOR TABLE ITEMS ⟵ 114

| COLUMN: | DESCRIPTION ▽ |
|---|---|
| DESCRIPTION: | |
| PROMPT: | |
| DEFAULT VALUE: | |
| DEFAULTING PROCEDURE: | NONE ▽ |
| VALIDATION PROCEDURE: | NONE ▽ |
| LANGUAGE FLAG: | |
| NULLABLE FLAG: | |
| TRANSACTION LOGGING FLAG: | |

[CANCEL] [OK]

FIG. 14

UNIQUE KEY DEFINITIONS FOR TABLE ITEMS

| ACTIONS | KEY NUMBER | SEQUENCE | TABLE COLUMN DESCRIPTION |
|---|---|---|---|
| EDIT DELETE | 1 | 1 | ORG ID |
| EDIT DELETE | 1 | 2 | CONTAINS THE IDENTIFIER OF A PRODUCT OR SUBSTANCE THAT IS BOUGHT, SOLD, MANUFACTURED, DELIVERED, OR IS SOMEHOW HANDLED IN SIMILAR BUSINESS PROCESSES. SYNONYMS: MATERIAL, PART, RESOURCE ,STOCK KEEPING UNIT (SKU). |

BACK TO TABLE DEFINITION | NEW UNIQUE KEY DEFINITION...

FIG. 15

EDIT UNIQUE KEY DEFINITION FOR TABLE ITEMS

| KEY NUMBER: | 1 |
|---|---|
| SEQUENCE: | 1 |
| TABLE COLUMN: | ORG_ID |

[CANCEL] [OK]

FIG. 16

PROCEDURE DEFINITIONS

| PROCEDURE | TYPE |
|---|---|
| ADDRESSES_C | CON |
| ADDRESSES_D | DEL |
| ADDRESSES_I | INS |
| ADDRESSES_U | UPD |
| BUILD | MAN |
| BUSINESS_PARTNERS_C | CON |
| BUSINESS_PARTNERS_D | DEL |
| BUSINESS_PARTNERS_I | INS |
| BUSINESS_PARTNERS_U | UPD |
| BUYERS_C | CON |
| BUYERS_D | DEL |
| BUYERS_I | INS |
| BUYERS_U | UPD |
| CODES_C | CON |
| CODES_D | DEL |
| CODES_I | INS |
| CODES_U | UPD |
| COLUMN_TYPES_C | CON |
| COLUMN_TYPES_D | DEL |
| COLUMN_TYPES_I | INS |
| COLUMN_TYPES_U | UPD |
| COLUMNS_C | CON |
| COLUMNS_D | DEL |
| COLUMNS_I | INS |
| COLUMNS_U | UPD |
| COUNTRIES_D | DEL |
| COUNTRIES_I | INS |
| COUNTRIES_U | UPD |
| CREATE_INSTALL | MAN |
| CREATE_PROC_CON | MAN |
| CREATE_PROC_DALL | MAN |
| CREATE_PROC_DEL | MAN |
| CREATE_PROC_IALL | MAN |
| CREATE_PROC_INS | MAN |
| CREATE_PROC_SUB | MAN |
| CREATE_PROC_UPD | MAN |
| CREATE_PROCEDURES | MAN |
| CREATE_TABLES | MAN |
| CREATE_TABLES_FROM_TABLES | MAN |
| CREATE_TABLES_FROM_TABS | MAN |

FIG. 17

| EDIT PROCEDURE DEFINITION | | |
|---|---|---|
| NAME: | ADDRESSES_C | |
| PROCEDURE TYPE: | GENERATED CONTROL OF DATABASE UPDATES | ▽ |
| TABLE: | ADDRESSES | ▽ |
| KEY NUMBER: | | |
| MODIFIED SINCE LAST GENERATION: | NO | |
| PROCEDURE TABLES: | MANAGE DEFINITIONS | |

122a, 122b, 122c, 122d, 122e, 122f → 122

[DELETE]

[RESET] [OK]

FIG. 18

TABLE_VERSIONS

| ID | TABLE_CODE | VERSION |
|---|---|---|
|  |  |  |
| 1092 | ORG_STRUCTURE | 3 |
| 1195 | ORG_STRUCTURE | 4 |
|  |  |  |
| 1093 | ORGS | 3 |
| 1170 | ORGS | 4 |
|  |  |  |
|  |  |  |

TABLE_VERSION_COLUMNS

| ID | TABLE_VERSION_ID | COLUMN_CODE | COLUMN_TYPE | NEGATIVE_ALLOWED_FLAG | NULLABLE_FLAG | ORACLE_DATATYPE |
|---|---|---|---|---|---|---|
| 3643 | 1092 | LEVEL_NUMBER | INT | X | (NULL) | NUMBER (10) |
| 3644 | 1092 | ORG_ID | ID | (NULL) | (NULL) | INTEGER |
| 3645 | 1092 | PARENT_ORG_ID | ID | (NULL) | (NULL) | INTEGER |
| 4968 | 1195 | LEVEL_NUMBER | SMALLINT | X | (NULL) | NUMBER (5) |
| 4969 | 1195 | ORG_ID | ID | (NULL) | (NULL) | INTEGER |
| 4970 | 1195 | PARENT_ORG_ID | ID | (NULL) | (NULL) | INTEGER |
| 3646 | 1093 | CURRENCY_ID | ID | (NULL) | (NULL) | INTEGER |
| 3647 | 1093 | DESCRIPTION | DESCRIPTION | (NULL) | X | VARCHAR2 (255) |
| 3649 | 1093 | NAME | NAME | (NULL) | (NULL) | VARCHAR2 (50) |
| 3650 | 1093 | NAME_ID | ID | (NULL) | X | INTEGER |
| 3651 | 1093 | PARENT_ORG_ID | ID | (NULL) | (NULL) | INTEGER |
| 4740 | 1170 | CURRENCY_ID | ID | (NULL) | X | INTEGER |
| 4741 | 1170 | DESCRIPTION | DESCRIPTION | (NULL) | X | VARCHAR2 (255) |
| 4742 | 1170 | NAME | NAME | (NULL) | (NULL) | VARCHAR2 (50) |
| 4743 | 1170 | NAME_ID | ID | (NULL) | X | INTEGER |
| 4744 | 1170 | PARENT_ORG_ID | ID | (NULL) | (NULL) | INTEGER |

FIG. 19B

METHOD OF MODIFYING A POPULATED DATABASE STRUCTURE BY MODIFYING METADATA DESCRIBING THE DATABASE STRUCTURE

FIELD OF THE INVENTION

The present invention pertains to the field of database generation, maintenance and modification. More particularly, the present invention relates to a method of modifying database object structures in accordance with changes made to metadata objects describing the database objects.

BACKGROUND OF THE INVENTION

Relational databases are advantageous in that the duplication of information or data within a relational database is limited by defining relationships between data records (or rows) in a number of data objects. Accordingly, the updating of the actual data within the database is simplified as the occurrence of the duplicate data items within the database is minimized. However, the modification of the structure (as opposed to the database data) of a populated database, for example by the modification of data formats, types or lengths or by the addition of columns to a table within the database, is nonetheless problematic, and typically requires the intervention of a database expert. For example, a particular data item (e.g., an amount) may be defined to have a particular format that requires modification (e.g., from the 999.9999 format to the 99999.99 format). As such a data item may be referenced by a number of the dependent tables and procedures within a database, such a modification to a populated database structure typically requires a database expert to make corresponding modifications to all dependent tables and procedures. The location, identification and modification of such dependent objects (e.g., table, procedure and view objects) must manually be performed, and is thus time consuming and inefficient. Further, the modification task is made difficult by the presence of data within such dependent objects. The problem is exasperated when massive databases are employed in complex systems, such as Enterprise Resource Planning (ERP) systems.

SUMMARY OF THE INVENTION

According to the invention, there is provided a method of modifying a database structure. Metadata, which describes the database structure, is modified. The database structure is then automatically modified to conform to the modified metadata.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 illustrates a view, according to the present invention, showing selected information regarding a number of rows within an exemplary COLUMN TYPES object.

FIG. 8 illustrates a user interface for generating and editing a COLUMN TYPE row for inclusion within the COLUMN TYPE object.

FIG. 9 illustrates exemplary COLUMN rows for inclusion within a COLUMNS object.

FIG. 10 illustrates a user interface for generating and editing a COLUMN row.

FIG. 11 illustrates a view listing various TABLE rows that may exist within a TABLES object.

FIG. 12 illustrates a user interface for editing a TABLE definition.

FIG. 13 illustrates a view of the contents of an exemplary row within a TABLES_COLUMNS object.

FIG. 14 illustrates a user interface for editing a TABLE COLUMN definition for table items.

FIG. 15 illustrates a view listing unique key definitions for an ITEMS table.

FIG. 16 illustrates a user interface for editing unique key definitions for table ITEMS.

FIG. 17 illustrates a view listing various procedures that are included within a PROCEDURES object.

FIG. 18 illustrates a user interface by which a procedure definition may be edited.

FIGS. 19A and 19B are tables for TABLE_VERSIONS and TABLE_VERSION_COLUMNS objects.

DETAILED DESCRIPTION

A method of modifying a populated database structure to conform to modified metadata, describing the database structure, is described. In the following description, for purposes of explanation, numerous specific details are set forth in order to provide a thorough understanding of the present invention. It will be evident, however, to one skilled in the art that the present invention may be practiced without these specific details.

Network Structure

Figure 1A:
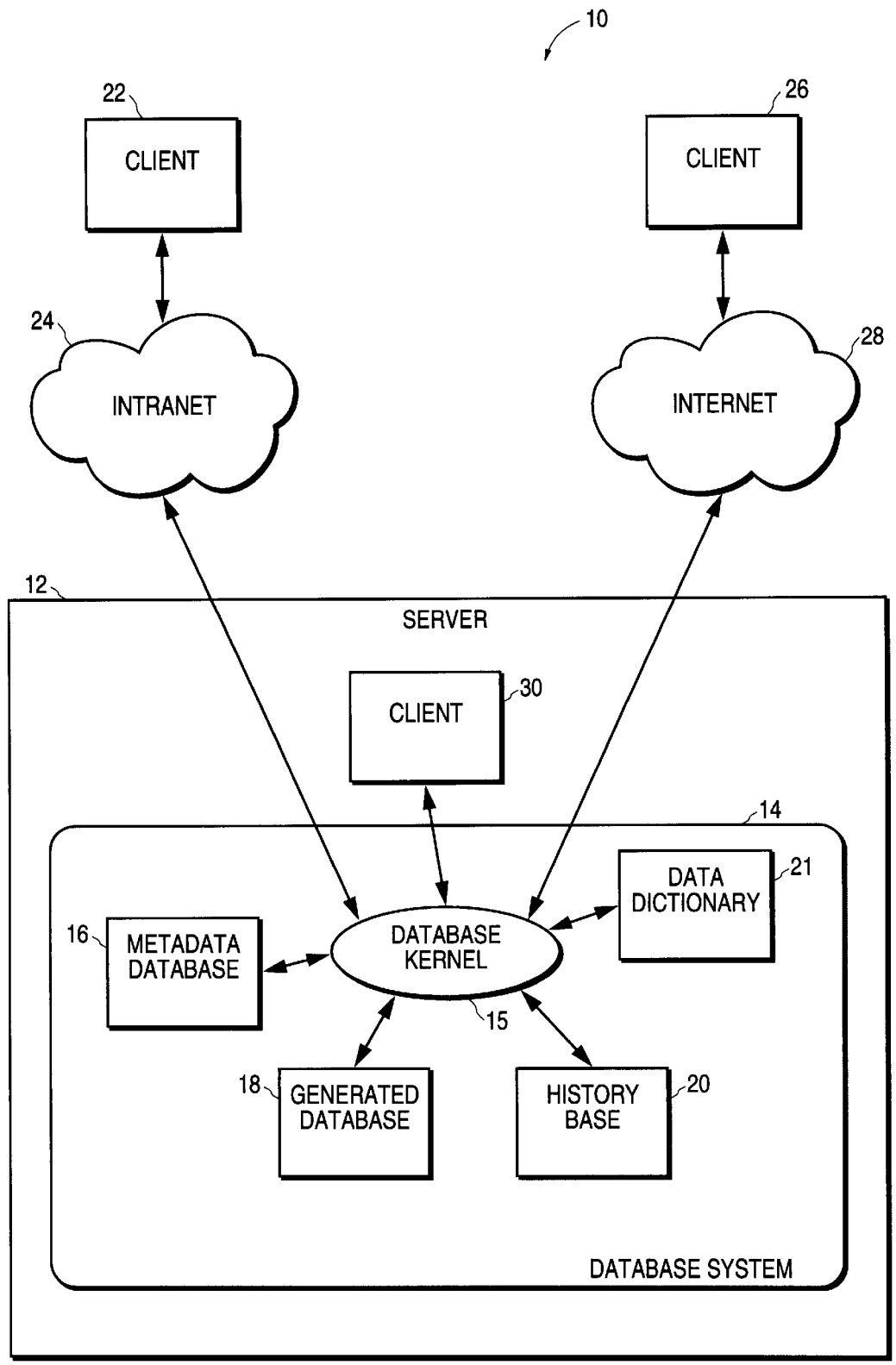
FIGS. 1A and 1B are diagrammatic representations of networks within which the present invention may be implemented.
Figure 1B:
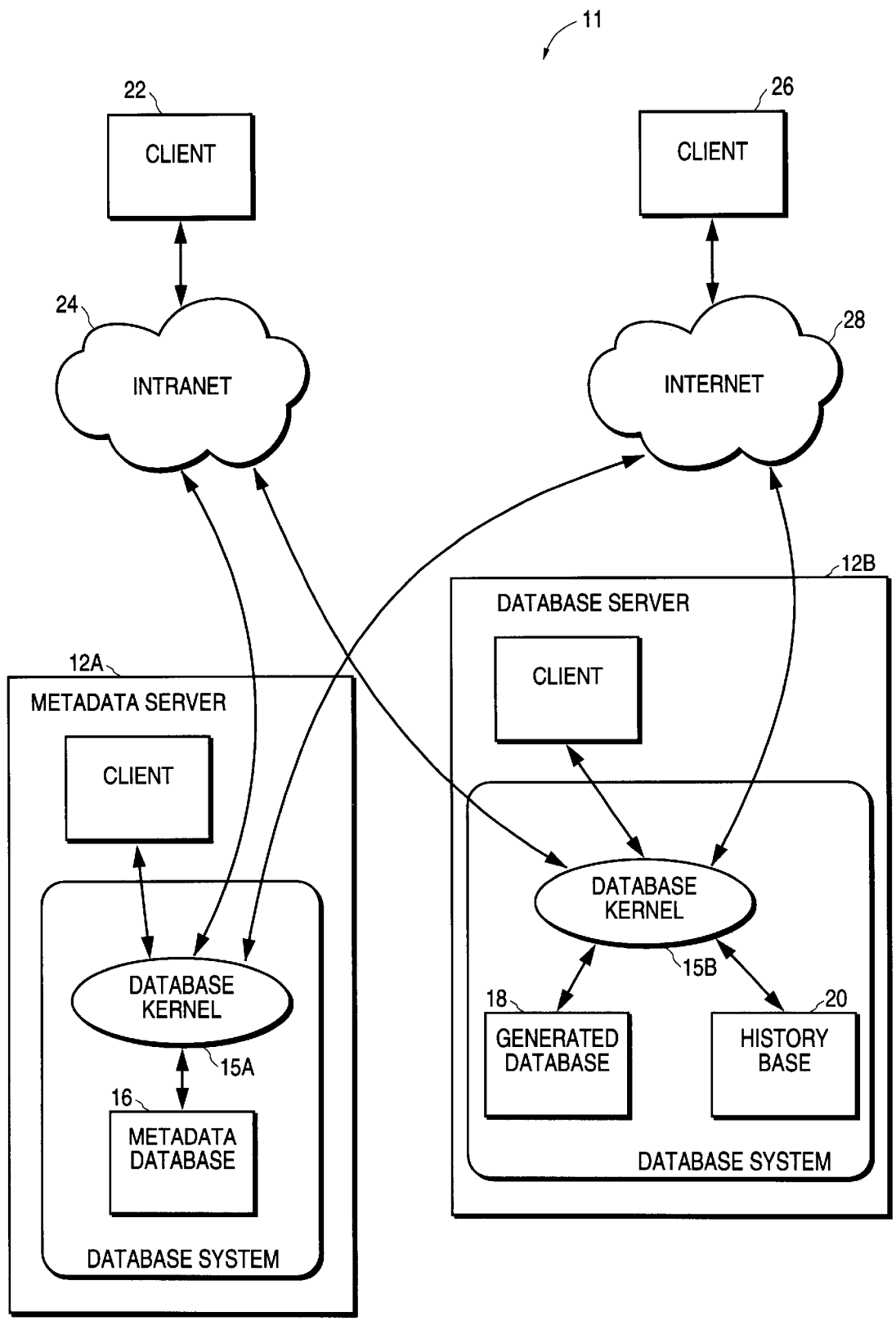

FIGS. 1A and 1B are diagrammatic representations of a networks, designated generally at 10 and 11, within which the present invention may be implemented. The network 10 includes a single server 12 that hosts a client 30 and a database system 14. The database system 14 includes a database kernel 15, a metadata database 16, a generated relational database 18, a history base 20 and a data dictionary 21. Other well known components of the database system are not shown.

The database system 14 is shown to be accessible by a client 22 via an intranet 24, by a client 26 via the Internet, and also by the client 30 resident on the server 12. In one embodiment of the invention, each of the clients 22, 26 and 30 comprises a browser, such as the Navigator browser from Netscape Communications Corp. of Mountain View, California or the Internet Explorer (IE) browser from Microsoft Corp. of Redmond, Washington State.

The database kernel 15 is responsible for facilitating access to the generated database 18, for the upgrading and modification of the database structure, and for the maintenance of the metadata database 16 as is described in further detail below. The database system 14 may for example comprise the Oracle 8 product from Oracle Corporation of Redwood Shores, Calif. or a SQL Server product from Microsoft Corp. or Sybase, Inc. of Emeryville, Calif.

FIG. 1B illustrates an alternative network configuration within which the present invention may be implemented. The network 11 differs from the network 10 shown in FIG. 1A in that the metadata database 16 and the generated database 18 reside on different physical servers, namely a metadata server 12A and a database server 12B respectively.

Data Structures

Figure 2:
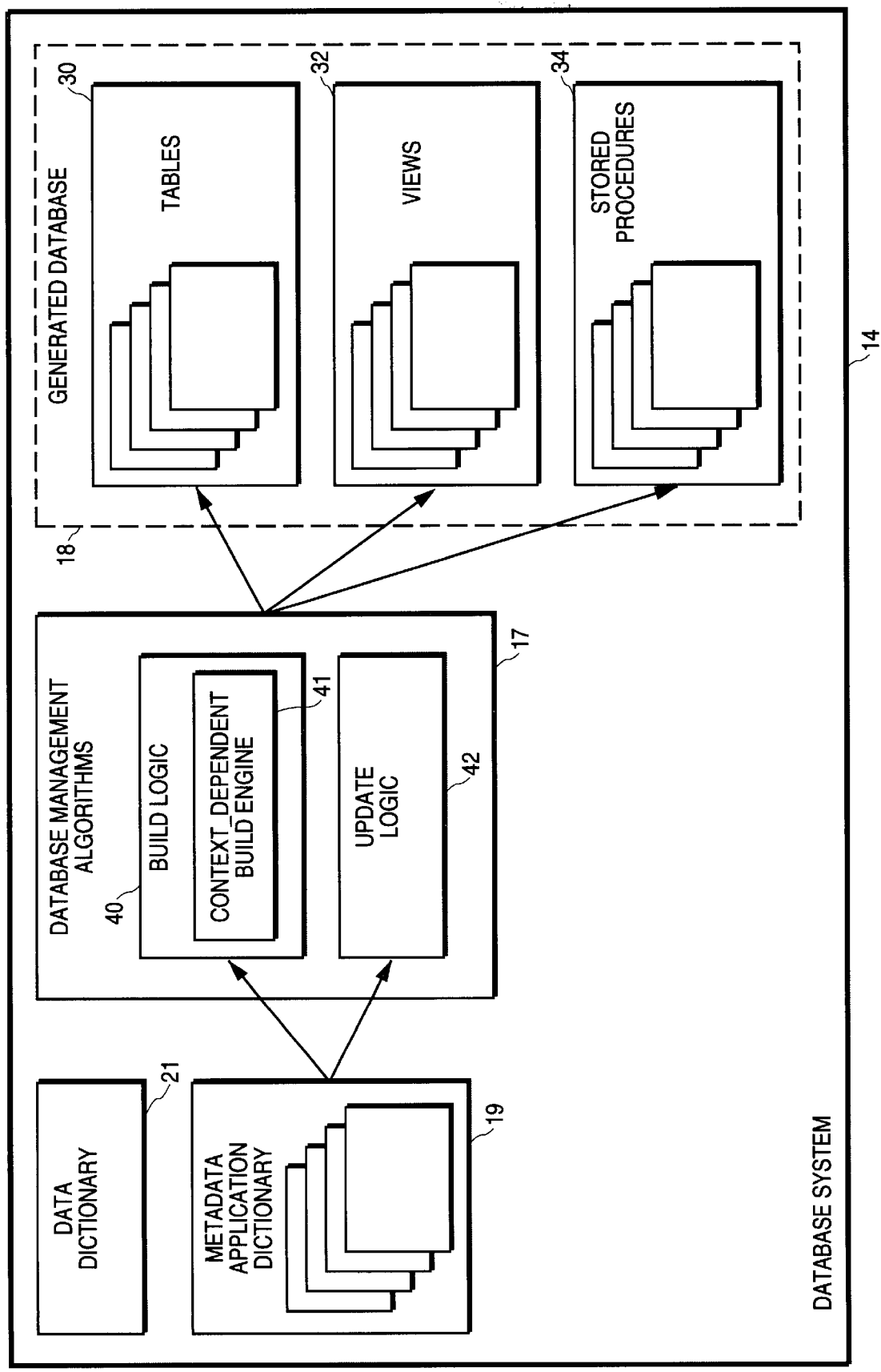
FIG. 2 is a block diagram illustrating an exemplary embodiment of a database system according to the present invention.

Referring now to FIG. 2, a more detailed representation of the database system 14 is shown. Specifically, more detailed representations of a metadata application dictionary 19 (that comprises part of the metadata database 16) and the generated database 18 are provided. The metadata application dictionary 19, which is distinct from a "data dictionary" 21 that may be defined within the database system 14, describes the respective structures of objects that comprise the generated database 18, as well as the relationships that are defined between the various database objects. The metadata application dictionary 19 typically comprises a collection of metadata objects in the form of tables (metatables) between which relationships are defined. The metadata objects (e.g. tables) describe the structure of objects within the generated database 18. For example, the metadata objects may describe the various columns that constitute a table within the generated database 18, and may further specify the format, type or other characteristics of these columns. The metadata objects may also include management information pertaining to tables and columns of the generated database 18, such as description information. For the purposes of this specification, "metadata tables" shall be regarded as being "metadata objects" and the term "object" shall be regarded as inclusive of the term "table".

The database system 14 is shown to include database management algorithms 17 in the form of build logic 40 and update logic 42. According to the present invention, the database system 14 utilizes the structures and relationships defined by metadata application dictionary 19 to update the various objects which comprises the generated database 18. In short, the present invention proposes allowing a user to specify modifications to the structure of the generated database 18 in the metadata database 16 (and specifically the metadata application dictionary 19), and then utilizing these modified specifications and relationships to update the generated database 18. This is in contrast with prior art systems, wherein the metadata database 16 is modified by the database kernel 15 responsive to the modification of database objects (such as the table, view, or stored procedure objects). The present invention thus requires that the structure of a generated database 18 be actively conformed to the descriptions and structures defined by the metadata database 16, as opposed to the prior art, where the descriptions contained in the metadata database 16 were generated from the structures in a generated database 18. Prior art, which teaches deriving metadata from the defined structures of objects within a database for the purposes of creating a repository of information describing the database, includes U.S. Pat. No. 4,805,099 (to Val J. Huber).

Figure 3:
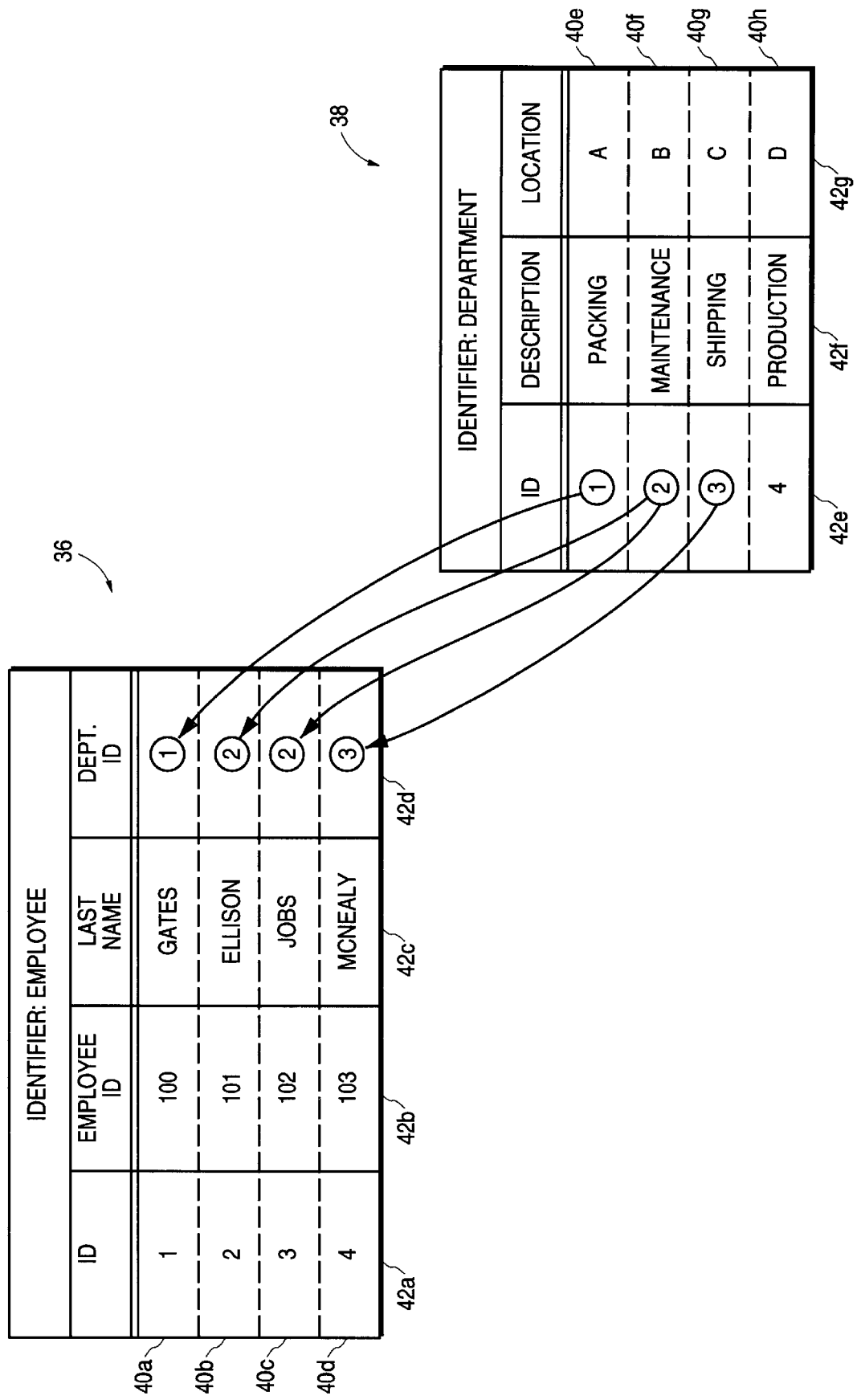
FIG. 3 illustrates two tables that may be included within a generated database according to the present invention.

The generated relational database 18 comprises a number of the database objects, including table objects 30, view objects 32, and stored procedure objects 34. Each table object 30 comprises a collection of records, each record having number of fields. Each record is stored in a row of a respective table object 30, and each field of that record is assigned to an appropriate column. Each field thus occupies one column and each record occupies one row of a table object 30. FIG. 3 illustrates two exemplary tables, namely an employee table 36 and a department table 38. Each table has an identifier (e.g. EMPLOYEE or DEPARTMENT), and is shown to comprise a number of rows and columns. Specifically, the table 36 includes rows 40a–40d, and table 38 includes rows 40e–40h. The table 36 includes four columns, namely an ID column 42a, an employee ID column 42b, a last name column 42c, and a department ID column 40d. The department table 38 includes an ID column 42e, a description column 42f and a location column 42g. Each record of a table object 30 has a primary key that uniquely identifies that record. The primary key may be a unique entry, or combination of entries, within a record. The ID column 42a contains entries that constitute respective primary keys for the records of employee table 36, while the ID column 42e includes entries that constitute respective primary keys for the records of the department table 38. In one embodiment of the present invention, the primary keys in columns 42a and 42e are "hidden" (i.e., not presented in any views) and are non-modifiable.

A record may further include a foreign key, which corresponds to the primary key of another table and accordingly establishes a relationship between a record of one table and a record of another table. The entries of the department ID column 42d of the table 36 comprise foreign keys, and correspond to primary key entries of the ID column 42e of the department table 38. Accordingly, it will also be appreciated that dependencies exist between table objects in a relational database. For example, the employee table 36 may be viewed as being dependent on the department table 38 for further information pertaining to an employee's department.

A column included within a table may further include one or more constraints regarding data that may be included within the column. Constraints are typically imposed to protect a relationship between data in two different tables. Accordingly, a unique (or primary) key constraint is a constraint imposed on a column that is the unique (or primary) key of a table, while a foreign key constraint is a constraint imposed on a column as a result of a unique key constraint of another table.

Figure 4:
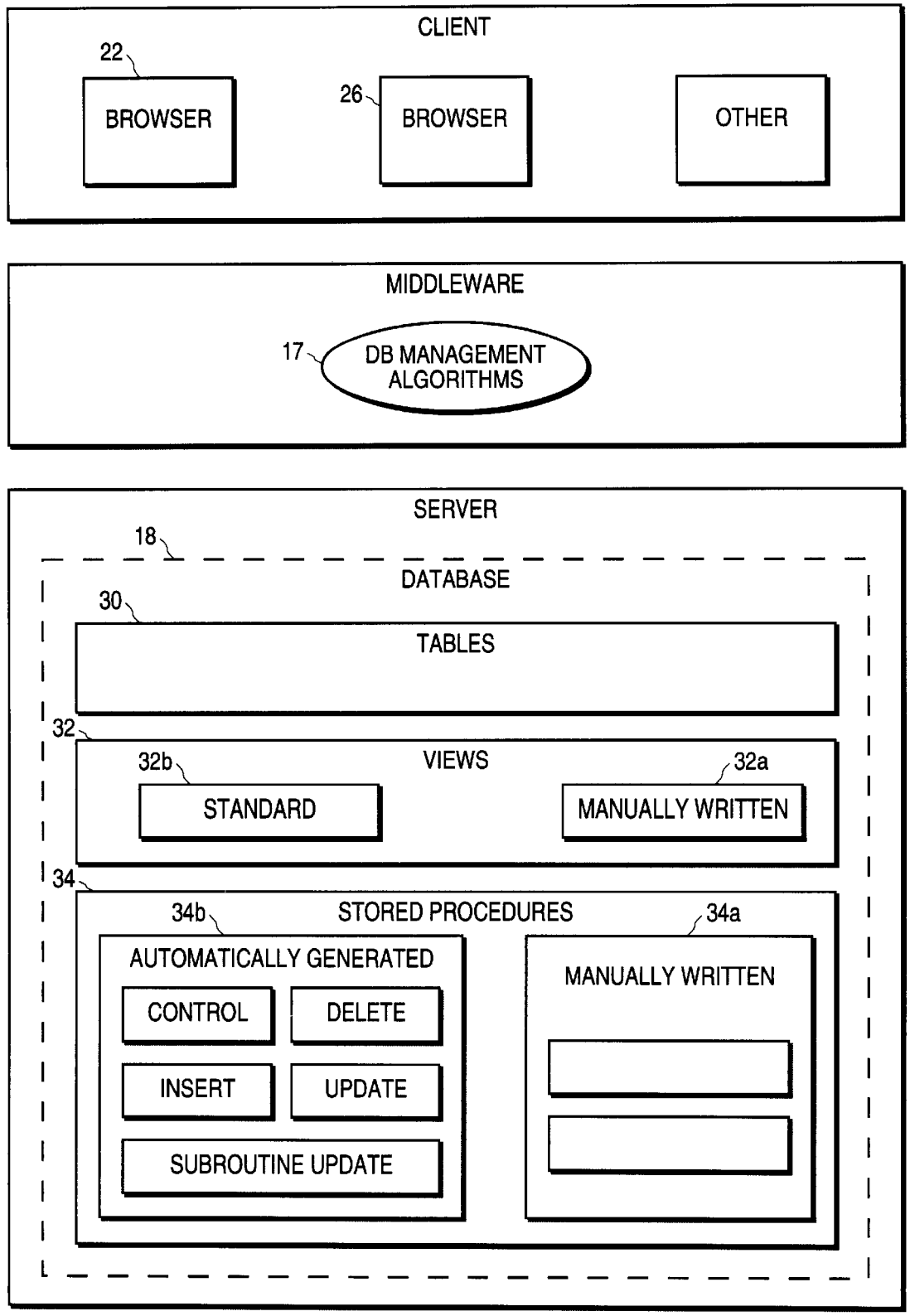
FIG. 4 is a block diagram illustrating further structural details of the database system shown in FIG. 2.

Returning now to FIG. 2, each view object 32 comprises a subset of data items, from one or more of the table objects 30, that is assembled in the server memory to satisfy the results of a Structured Query Language (SQL) statement. A view object 32 may thus be defined by a SQL statement, which retrieves specified data items from table objects 30 upon request, so as to provide selected information from the table object 30 to a user via a client. Referring to FIG. 4, the view objects 32 are shown to include both standard views 32b, which may be automatically updated according to the teachings of the present invention, and manually written views 32a, which may or may not be included within the view objects 32. Both the manually written and automatically generated views may be automatically updated by the update logic 42 of database system 14.

Stored procedure objects 34 typically comprise programs (or code segments) that are stored in the generated database 18 and that perform essential functions relating to the database system 14. For example, a stored procedure object 34 may comprise a program for extracting pertinent information from a table object 34, and then generating a personalized letter to a customer containing information retrieved from the table objects 30. A stored procedure object 30 may be triggered by a user-specified trigger event pertaining to the generated database 18. As shown in FIG. 4, stored procedure objects 34 may broadly be classified as being either manually written stored procedures 34a or automatically generated stored procedures 34b, which are generated according to the teachings of the present invention by the generation logic 40 of the database system 14. The automatically generated (or code-generated) stored procedures 34b include control procedures, insert procedures, delete procedures, update procedures and subroutine update procedures. Both the manually written and automatically generated procedures may be automatically updated by the update logic 42 of database system 14. Table 1 specifies, for an exemplary generated database 18, procedure definitions by procedure type.

TABLE 1

| Procedure Type | Description | How Defined | How Generated |
| --- | --- | --- | --- |
| MAN (Manual) | Manually Written Procedure | Manually | Manually |
| DEF (Defaulting) | Defaulting Procedure | Manually | Manually |
| VAL (Validation) | Validation Procedure | Manually | Manually |
| CON (Control) | Generated Control of Database Updates | Manually | Build + Upgrade Logic |
| SUB (Update Subset) | Generated Table Subset Update Procedure | Manually | Build + Upgrade Logic |
| INS (Insert) | Generated Standard Table Insert Procedure | Generated | Build + Upgrade Logic |
| UPD (Update) | Generated Standard Table Update Procedure | Generated | Build + Upgrade Logic |
| DEL (Delete) | Generated Standard Table Delete Procedure | Generated | Build + Upgrade Logic |

Table 2 lists a number of stored procedure objects, in the "Associated Definitions" column, that are included in an exemplary database described below with reference to FIG. 6.

TABLE 2

| Procedure Type | Associated Definitions | How Associated Definitions Defined |
| --- | --- | --- |
| MAN (Manual) | Procedure_Columns | Automatically when compiled |
| | Procedure_Columns_Types | Automatically when compiled |
| | Procedure_Dependencies | Automatically when compiled |
| | Procedure_Views | Automatically when compiled |
| DEF (Defaulting) | Procedure_Columns | Automatically when compiled |
| | Procedure_Columns_Types | Automatically when compiled |
| | Procedure_Dependencies | Automatically when compiled |
| | Procedure_Views + | Automatically when compiled |
| | Procedure_Arguments | Manually |
| VAL (Validation) | Procedure_Columns | Automatically when compiled |
| | Procedure_Columns_Types | Automatically when compiled |
| | Procedure_Dependencies | Automatically when compiled |
| | Procedure_Views + | Automatically when compiled |
| | Procedure_Arguments | Manually |
| CON (Control) | Procedure_Tables | Manually |
| SUB (Update Subset) | Procedure_Arguments | Manually |
| INS (Insert) | Tables (Insert Flag) | Manually |
| UPD (Update) | Tables (Update Flag) | Manually |
| DEL (Delete) | Tables (Delete Flag) | Manually |

Procedure types CON, DEL, INS, SUB, and UPD are code-generated Stored Procedures. Procedure types CON and SUB Stored Procedures are generated from the Procedures Table definitions. Procedure types DEL, INS and UPD Procedures Table definitions are automatically updated as the Stored Procedures are generated. Procedure types CON, DEF, MAN, SUB and VAL Procedures Table definitions must be manually updated. Procedure types DEL, INS, MAN, and UPD have only Procedures Table entries. Procedures type CON has Procedures (mandatory) and Procedure_Tables (optional) Table entries. Procedure types DEF, SUB and VAL have Procedures and Procedure_ Arguments Table entries.

Figure 5:
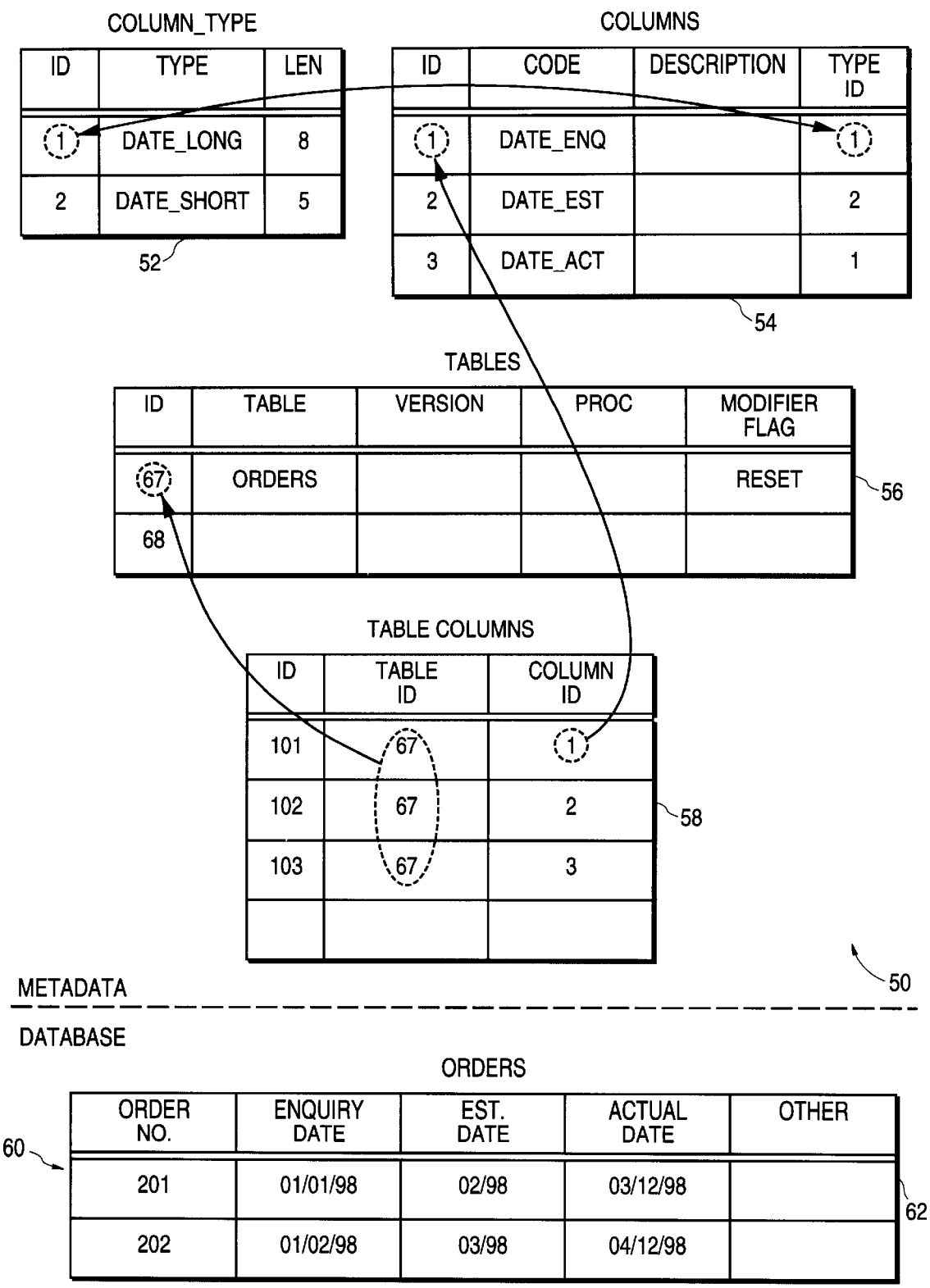
FIG. 5 is a diagrammatic representation of a portion of an exemplary metadata database according to one embodiment of the present invention.

FIG. 5 provides a diagrammatic representation of a portion of an exemplary metadata database 50 according to the present invention. The metadata database 50 is shown to include a number of table objects similar in structure to the table objects that comprise the generated database 18. The table objects of the metadata database 50 include records specifying structural, description and management information for objects within an associated database 60. The exemplary metadata database 50 comprises a COLUMN TYPE object 52, a COLUMNS object 54, a TABLES object 56, and a TABLE_COLUMNS object 58. The COLUMN TYPE object 52 specifies format information for various column types, and is shown to include three columns, namely an ID column, a type column and a length column. Two records are shown to exist in the object 52, these records specifying respective data lengths for a long date column type and a short date column type. The COLUMNS object 54 is shown to comprise four columns, namely an ID column, a code column, a description column and a type column. The COLUMNS object 54 includes records for enquiry date, estimated delivery date and actual delivery date columns which may be included within any of the tables of the database 60. The code column stores code names for the respective columns, the description column stores respective descriptions for the relevant columns, and the type column stores information specifying a column type attributed to each column. The enquiry date and actual delivery date column records are shown to have been attributed the long date column type, whereas the estimated delivery date column record is shown to have been attributed the short date column type. The TABLES object 56 is shown to specify an ID and a name (e.g., ID "67" and name "ORDERS") for each of the tables included in the generated database 60, and also includes various descriptive and management information pertaining to each table. The TABLE_COLUMNS object 58 provides a mapping of columns to a particular table ID, and thus specifies which columns are included within each table. Accordingly, the ORDERS object 62 of the generated database 60 is shown to include the enquiry date, the estimated delivery date, and the actual delivery date columns as defined in the COLUMNS object 54.

The build logic 40 and update logic 42 include sequences of instructions that are executed by a processor of the server 12, and cause the processor to utilize the information contained within the TABLE_COLUMNS object 58, and also information within the objects 52, 54, and 56 upon which the TABLE_COLUMNS object 58 is dependent, to generate and update the ORDERS object 62 within the database 60. This is the reverse of the methodologies and logic taught in the prior art, where metadata is generated from existing objects within the database to provide a readily accessible description of the database. The present invention is particularly advantageous in that it allows a database manager to make changes to the database object descriptions within the metadata database 50, and these modified descriptions are then utilized to modify objects (e.g. table, view and stored procedure objects) within the database 60.

For example, if a database manager wishes to change the format of all estimated delivery date columns within the database 60, the manager could simply alter the type specification in the COLUMNS object 54 to reflect the long date format. Accordingly, all records within the TABLE_COLUMNS object 58, that specify the estimated date column, and that are accordingly dependent on the COLUMNS object 54, would by reason of their dependencies include this updated information. Accordingly, objects may be generated and/or updated in the database 60 by the build and update logic 40 and 42 to reflect this modification. Similarly, a database manager could alter the length of the long date format from eight to nine characters, and this change would be propagated to all relevant objects within database 60 by reason of the dependencies that exist within the metadata database 50. The present invention is thus furthermore advantageous in that modifications are also made only to relevant objects within the database 60, and the modification process is accordingly "incremental" in nature. The ease with which modifications can be made to the database 60 is facilitated by the dependencies which are defined between the various objects which comprise the metadata, and by the use of metadata to generated and update structures and relationships of objects within the database 60.

In an exemplary embodiment, the generated database 18 and database system 14 may be utilized to implement an Enterprise Resources Planning (ERP) system. FIG. 6 illustrates a Booch notation diagram depicting an exemplary metadata database 70 that may be utilized to describe a database (not shown) for implementing the ERP system. Objects (i.e., tables) are represented in broken line, and rows or records (i.e., instances of these objects) are represented by circles and shown to be included in respective table objects. Each row (or record) in each metadata object (e.g., row T1 in object TABLES) represents a table (i.e., object) in the generated database 60 and also a view (i.e., yet a further object). The objects shown to be included within the metadata database 70 include a COLUMN TYPES object 72, a COLUMNS object 74, a TABLE_COLUMNS object 76, a UNIQUE KEY COLUMNS object 78, a TABLES object 80, a PROCEDURE TABLES object 82, a PROCEDURE COLUMNS object 84, a PROCEDURES object 86, a PROCEDURE ARGUMENTS object 88, a PROCEDURE COLUMN TYPES object 90, a PROCEDURE VIEWS object 92 and a PROCEDURE DEPENDENCIES object 94.

Arrows depict various dependencies that exist between the rows (or records) of metadata objects. For example, the TABLE_COLUMNS object row TC1 is shown to be dependent on the COLUMNS OBJECT row C1, the TABLES object row T1 and the UNIQUE KEY COLUMNS object row UK1 in a manner analogous to that described above with reference to FIG. 5.

Figure 6:
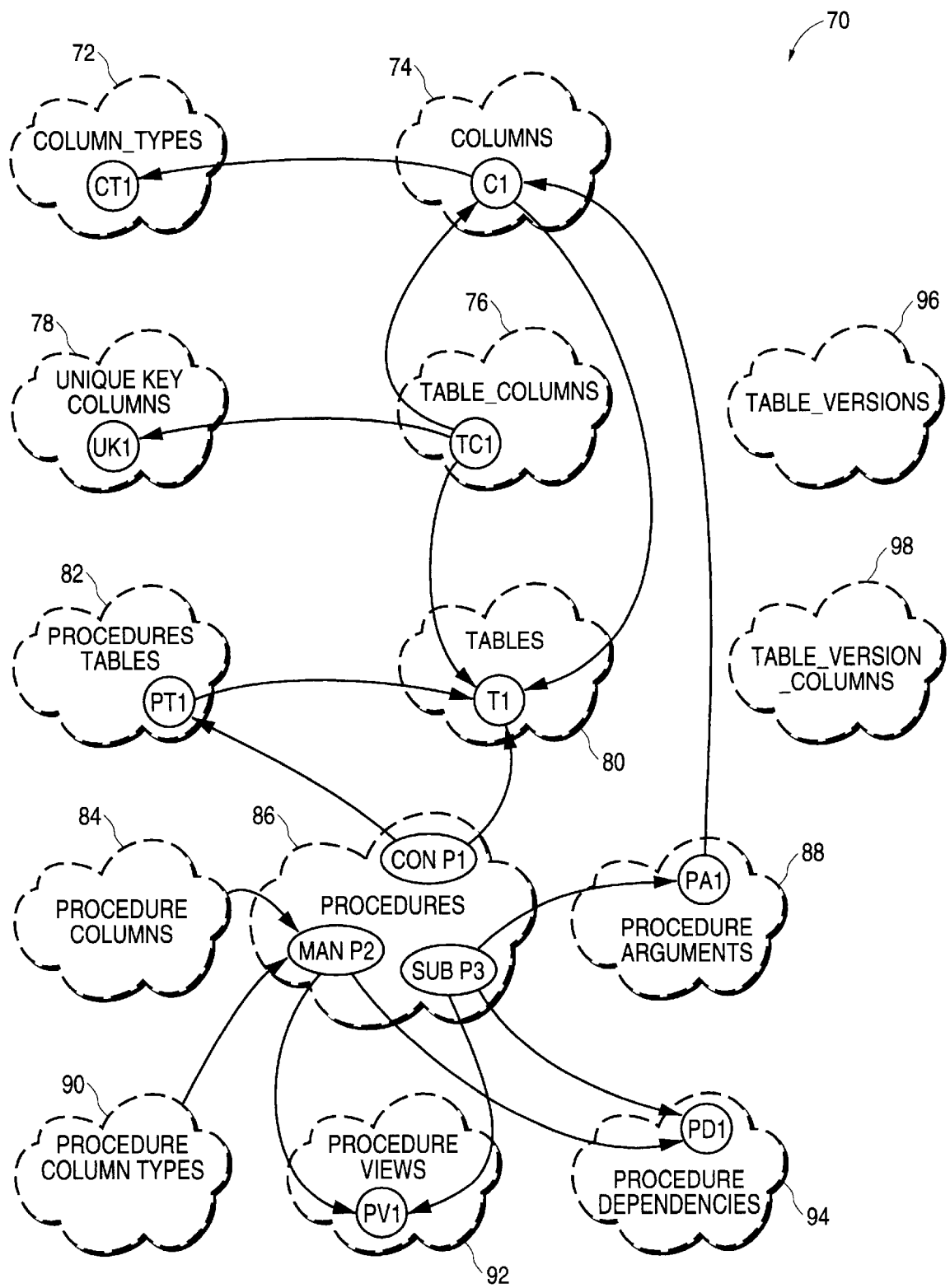
FIG. 6 is a Booch notation diagram depicting an exemplary metadata database according to one embodiment of the present invention.

A brief description of each of the objects 72–94 will now be provided, with reference to FIG. 6 in conjunction with FIGS. 7–18. Turning first to the COLUMN TYPES objects 72, this object includes a number of rows that specify type and format information that can be referenced by a column to attribute the required type and format characteristics to the referencing column. FIG. 7 illustrates a view 100 showing selected information from a number of rows within an exemplary column types object 72. FIG. 8 illustrates a user interface 102 by which a user can generate and edit a COLUMN TYPE row for inclusion within the COLUMN TYPE object 72. The information that can be included within a COLUMN TYPE row is apparent from the input fields displayed in the user interface 102. Specifically, each COLUMN TYPE row includes an identifier (e.g., a name ), that comprises the "column type" input 102a. This identifier uniquely identifying each COLUMN TYPE row. A user further has the option of attributing a specific data type (i.e., a numeric, character or date type) and data length to the COLUMN TYPE row via input fields 102b and 102c. Also of interest is the ability by a user to specify data types, via input fields 102g and 102i, for both Oracle 8 and SQL Server databases. This feature is particularly useful in converting a database table from an Oracle 8 format to a SQL Server format, or vice versa.

A view 104 illustrating exemplary COLUMNS rows included within the COLUMNS object 74 is shown in FIG. 9. Each COLUMNS row listed in the view 104 includes a column code, shown at 104a, by which the COLUMNS row is uniquely identified. Each COLUMNS row is furthermore shown to include a type specified, displayed in column 104d, that corresponds to a COLUMN TYPES row included within the COLUMN TYPES object 72. FIG. 10 illustrates a user interface 106, utilizing which a user can generate and edit a COLUMNS row. As illustrated, a user can input and modify column code and column type information via fields 106a and 106d respectively. Also of interest is the input field 106h, via which a user can specify a foreign key table within the database.

FIG. 11 illustrates a view 108 listing various table rows that exist within the TABLES object 80. FIG. 12 illustrates a user interface 110, via which a user may edit a table definition. For example, a user may specify a unique identifier code in an input field 110a.

FIG. 13 illustrates a view of the contents of exemplary rows within the TABLE_COLUMNS object 76. The rows from which the view 112 is extracted map a number of columns defined by rows within the COLUMNS objects 74 to a TABLES row within the TABLES object 80. A row for the ITEMS table, within the TABLES object 80 and listed in the view 108 of FIG. 11 (at 108*a*), is associated with a number of COLUMNS rows listed in column 112*a* and included within the COLUMNS object 74. FIG. 14 illustrates a user interface 114 with which a user can input and modify information pertaining to each of the columns listed within a TABLE_COLUMNS row.

FIG. 15 illustrates a view 116 listing unique key definitions for the ITEMS table, while FIG. 16 illustrates a user interface 118 using which the unique key definitions for a specific table within the database can be inputted or updated. The user interface 118 provides a table column field 118*a* at which a user can identify columns within a table to comprise unique key columns for that table.

FIG. 17 illustrates a view 120 listing exemplary procedures that are included within the PROCEDURES objects 86. The view 120 provides a first column 120*a* in which an identifier for each procedure is listed, and a second column 120*b* in which a type characteristic for each procedure is identified. Specifically, each procedure is shown to be identified as being a control (CON), a delete (DEL), an insert (INS), an update (UPD) or a manually written (MAN) procedure type. Each procedure may be identified as being any one of the procedure types listed above in Table 1.

Each table object within the database may have one or more procedures associated therewith for performing control, deletion, insertion, updating and other operations with respect to the relevant table object. For example, the control procedure CON P1 of the PROCEDURES object 86 is shown in FIG. 6 to be related to, and to depend from, the TABLE row T1 within the TABLES object 80.

FIG. 18 illustrates a user interface 122 through which a user can specify a particular procedure type for a procedure at field 122*b*, and define a foreign key relationship between the relevant procedure object and a table object at field 122*c*.

Referring again to FIG. 6, the metadata database 70 finally also includes TABLE_VERSIONS and TABLE_VERSION_COLUMNS objects 96 and 98 that include records logging modifications made to objects within the generated database, via the metadata. Examples of the objects 96 and 98 are provided in FIGS. 19A and 19B. The examples provided log modifications that were made to ORG_STRUCTURE and ORGS tables, which are included within an exemplary generated database 60, between versions 3 and 4.

Figure 19A:

The TABLE_VERSIONS table 96 illustrated in FIG. 19A contains a record (or row) for each version of the relevant tables that w has existed. Each record has an identifier (ID) associated therewith by which the version of the table is identified. For example, the ORG_STRUCTURE table, version 3, is identified by the ID 1092 while version 4 of this table is identified by the ID 1195.

The TABLE_VERSION_COLUMNS table 98 illustrated in FIG. 19B includes a record for each column within each of the relevant tables, and records specific details regarding each of these columns. By comparing records for a specific column that were created for different versions of a relevant table, modifications to a column are recognized. For example, between versions 3 and 4 of the ORG_STRUCTURE table, the LEVEL_NUMBER column was changed from an integer (INT) data type with a length of 10 to a small integer (SMALLINT) data type with a length of 5. Further, in the ORGS table, the CURRENCY_ID column changed from being NOTNULLABLE to being NULLABLE from version 3 to version 4. These modifications are documented in FIG. 19B.

Methodologies

Figure 20:
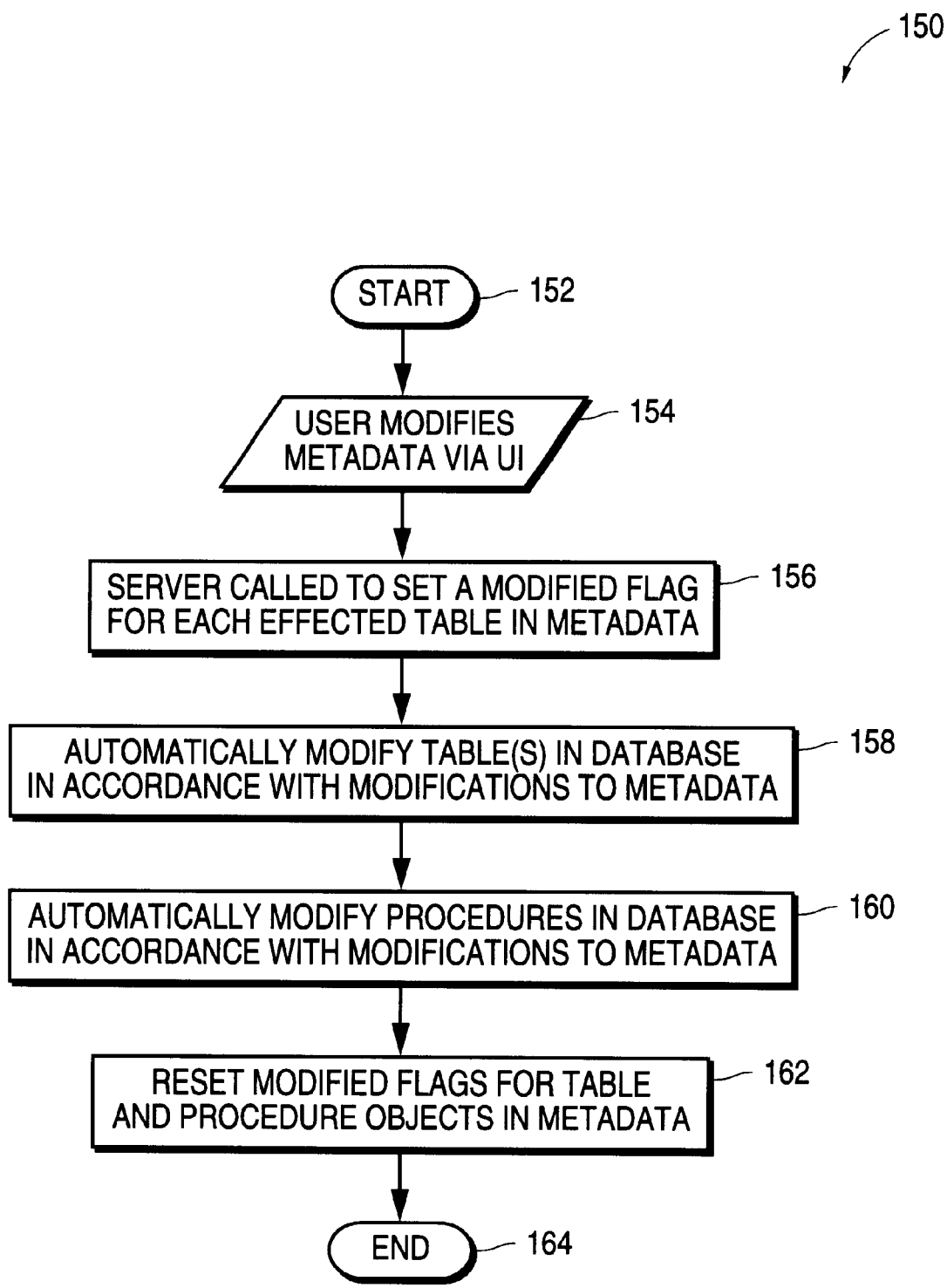
FIG. 20 is a flow chart illustrating a method, according to one embodiment of the present invention, of modifying a database structure by modifying metadata describing that database structure.

FIG. 20 is a flow chart illustrating at a high level a method 150, according to the present invention, of modifying a database structure by modifying metadata describing that database structure. The method 150 is performed by the database system 14, which interacts with the metadata database 16, the generated database 18 and the history base 20.

The method 150 commences at 152, and then proceeds to step 154 where a user, such as a database manager, modifies the metadata database 16 using a user interface. For example, the user may modify any one of the rows included within the objects illustrated in FIG. 6 using user interfaces such as those illustrated in FIGS. 8, 10, 12, 14, 16 or 18. Referring to the exemplary metadata objects shown in FIG. 5, a user could, for example, modify the column type specification of the estimated delivery date from the short date format to the long date format using a user interface similar to that illustrated at 106 in FIG. 10.

The method 150 advances from step 154 to step 156, where the server 12 is called to set a modified flag for each row of each object in the metadata database 16 affected by the modification. Specifically, each row within the object of the metadata includes a modified field that can be set or reset to indicate whether, for example, a table described a relevant table row is affected by the modification to the metadata. The setting of the modified flag for each affected row requires examining the dependencies and relationships that exist between rows of objects that exist within the metadata database 16. Referring to the example provided in FIG. 5, if the length of the long data column type is modified from 8 to 9 characters, this modification will be propagated down via dependencies that exist between the various tables to TABLES object 56.

Figure 27A:
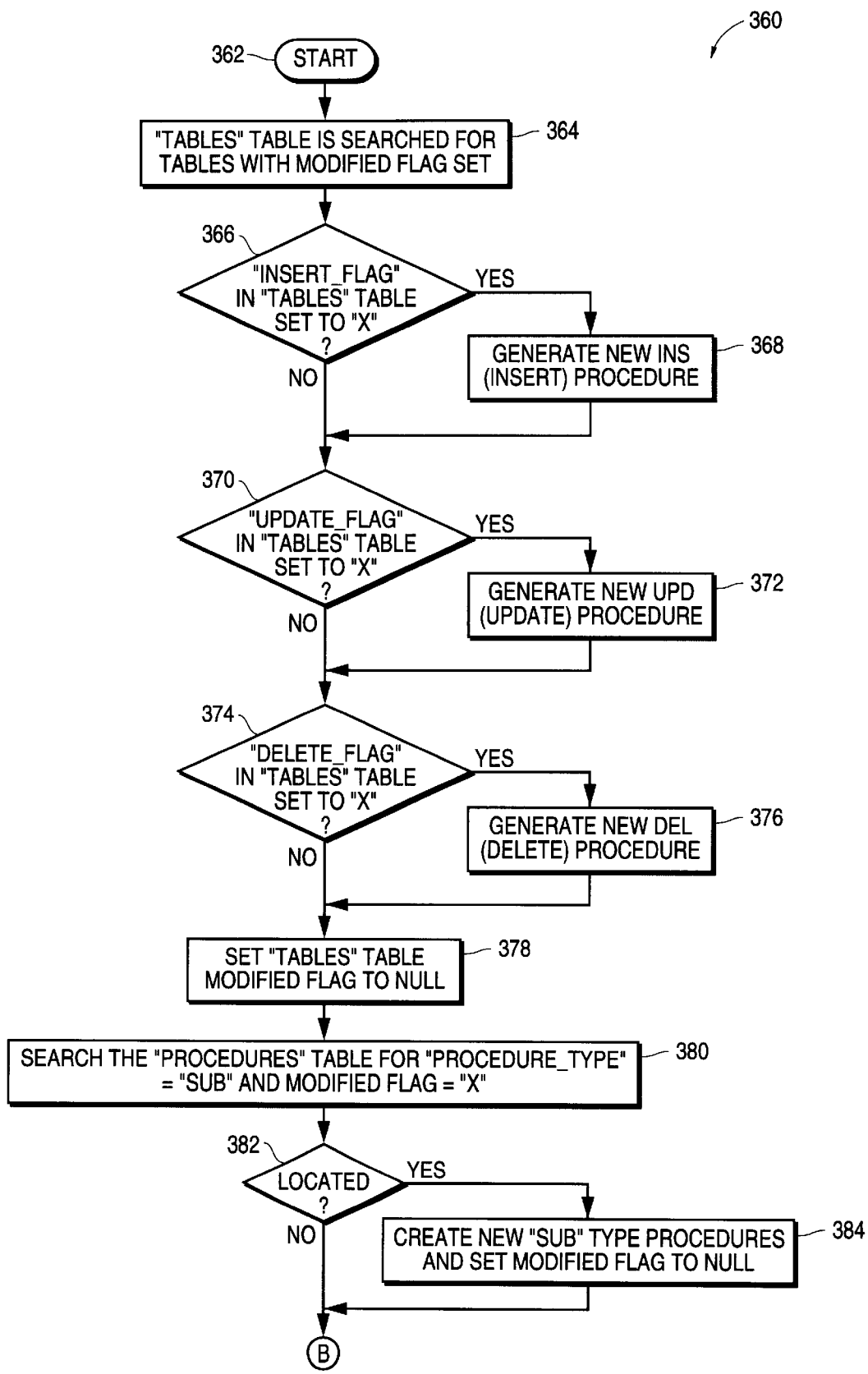
FIGS. 27A and 27B illustrate a flow chart showing the steps required, according to one embodiment of the present invention, to perform an automatic procedure modification.
Figure 27B:
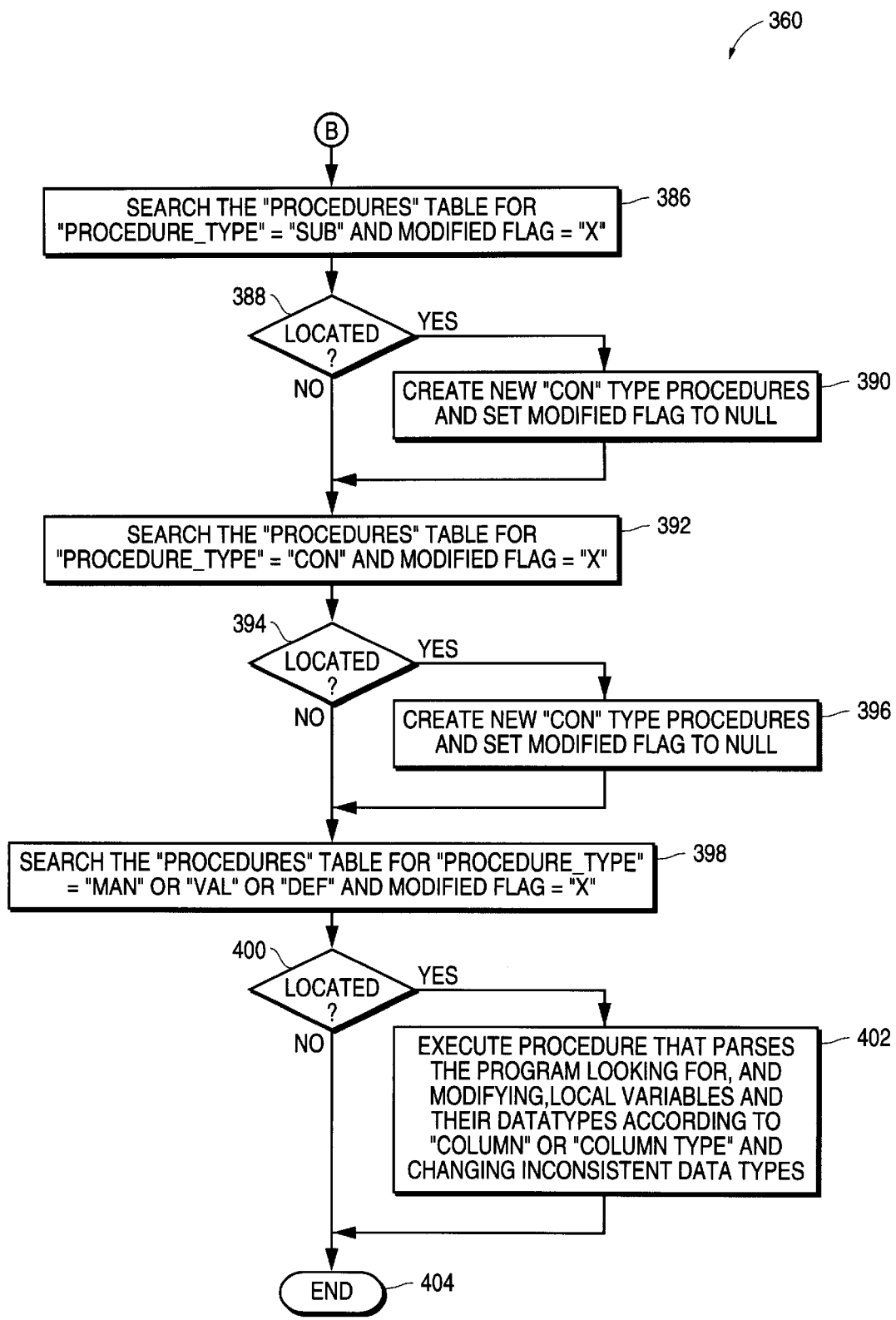

At step 158, tables within the generated database 18 are automatically modified in accordance with the modifications made to the metadata database 16 at step 154. Further details regarding this automatic modification of tables of the generated database 18 are provided below. At step 160, procedures within the database are also automatically modified in accordance with modifications made to the metadata database 16. Further details regarding the automatic modification of procedures by a server executing the update logic 42 are illustrated in FIGS. 27A and 27B. At step 162, the modified flag for table and procedure rows in the metadata database 16 are reset. The method 150 then terminates at step 164.

Figure 21:
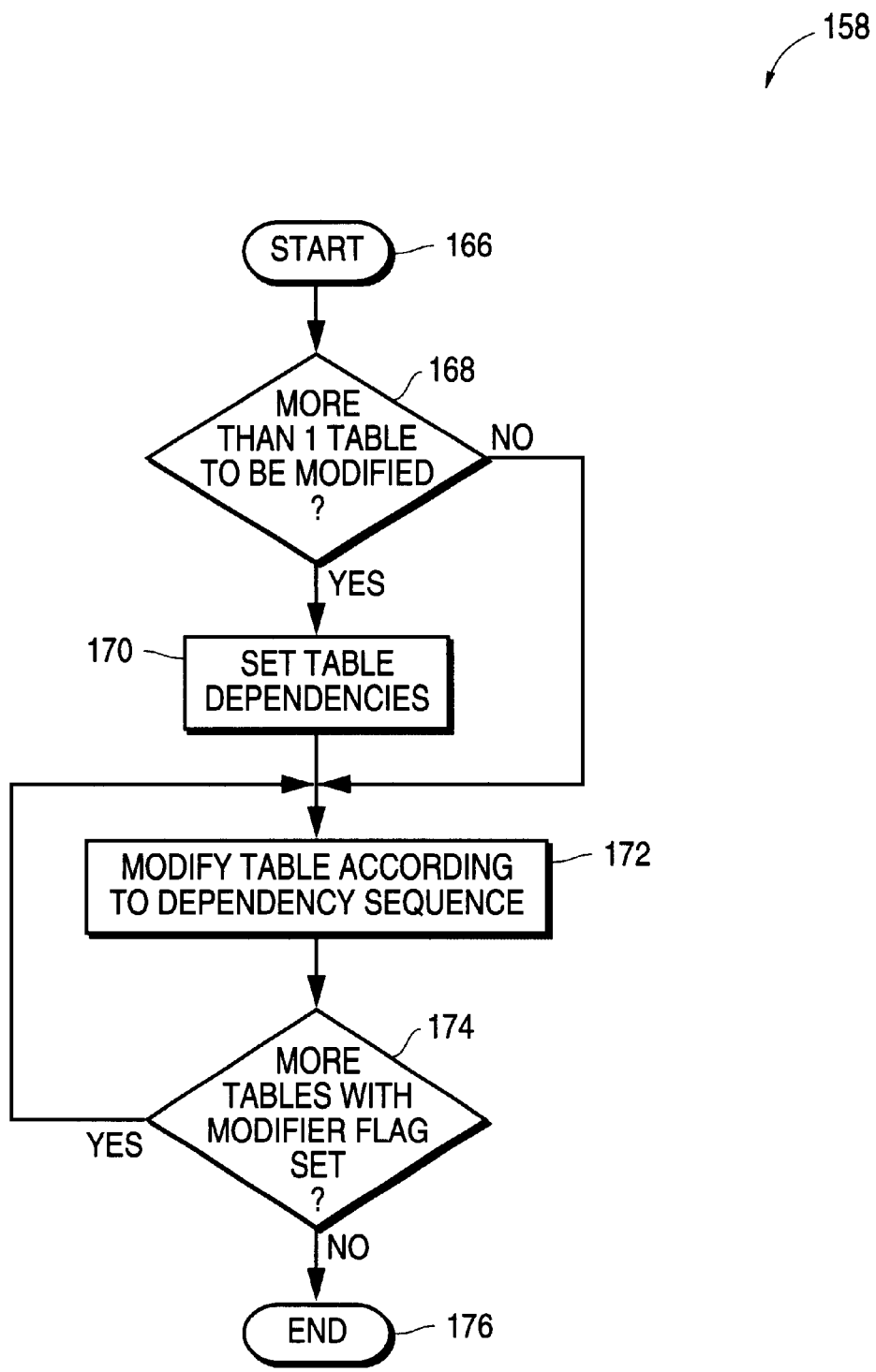
FIG. 21 is a flow chart illustrating in further detail the step, according to one embodiment of the present invention, of automatically modifying tables within a database in accordance with modifications made to associated metadata.

FIG. 21 is a flow chart illustrating the sub-steps which comprise the step 158 of method 150. Step 158 commences at 166, and proceeds to decision box 168, where a determination is made as to whether more than one table is to be modified. This determination is made by examining the modifier flags of table rows within the metadata database 16. If so, table dependencies for tables within the generated database 18 (as opposed to tables within the metadata database 16) are set. For example, referring to FIG. 3, where the table 36 is dependent on the table 38 and assuming that the format for the department number data entries is to be modified, the table 36 would have a table dependency set to indicate its dependency on the table 38. Accordingly, a dependency sequence is established wherein, for example, the table 38 would be modified prior to the table 36 in the dependency sequence as the table 36 is dependent on the table 38. From step 170, the step 158 proceeds to step 172.

Returning to decision box 168, should it be established that more than one table requires modification, the step 158 proceeds directly from decision box 168 to step 172.

At step 172, the first table within the dependency sequence is modified in accordance with the modified description within the metadata database 16, whereafter a determination is made at decision box 174 whether there are any further tables which have a set modifier flag. If so, step 172 is revisited. The step 158 loops through steps 172 and 174 until all tables having set modifier flags have been modified. The step 158 then terminates at step 176.

Figure 22A:
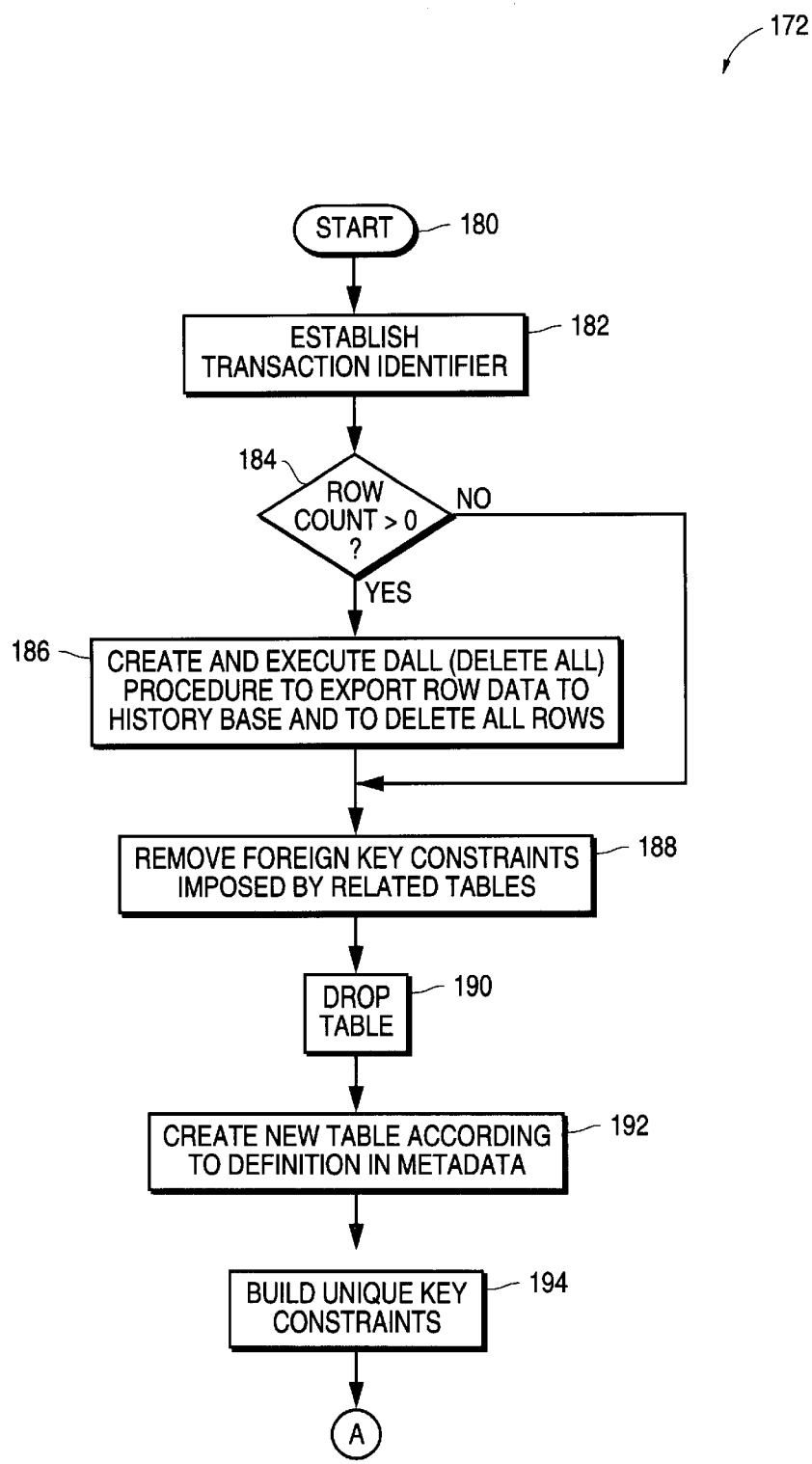
FIGS. 22A and 22B show a flow chart illustrating the steps required, according to one embodiment of the present invention, to modify a table according to a dependency sequence.
Figure 22B:
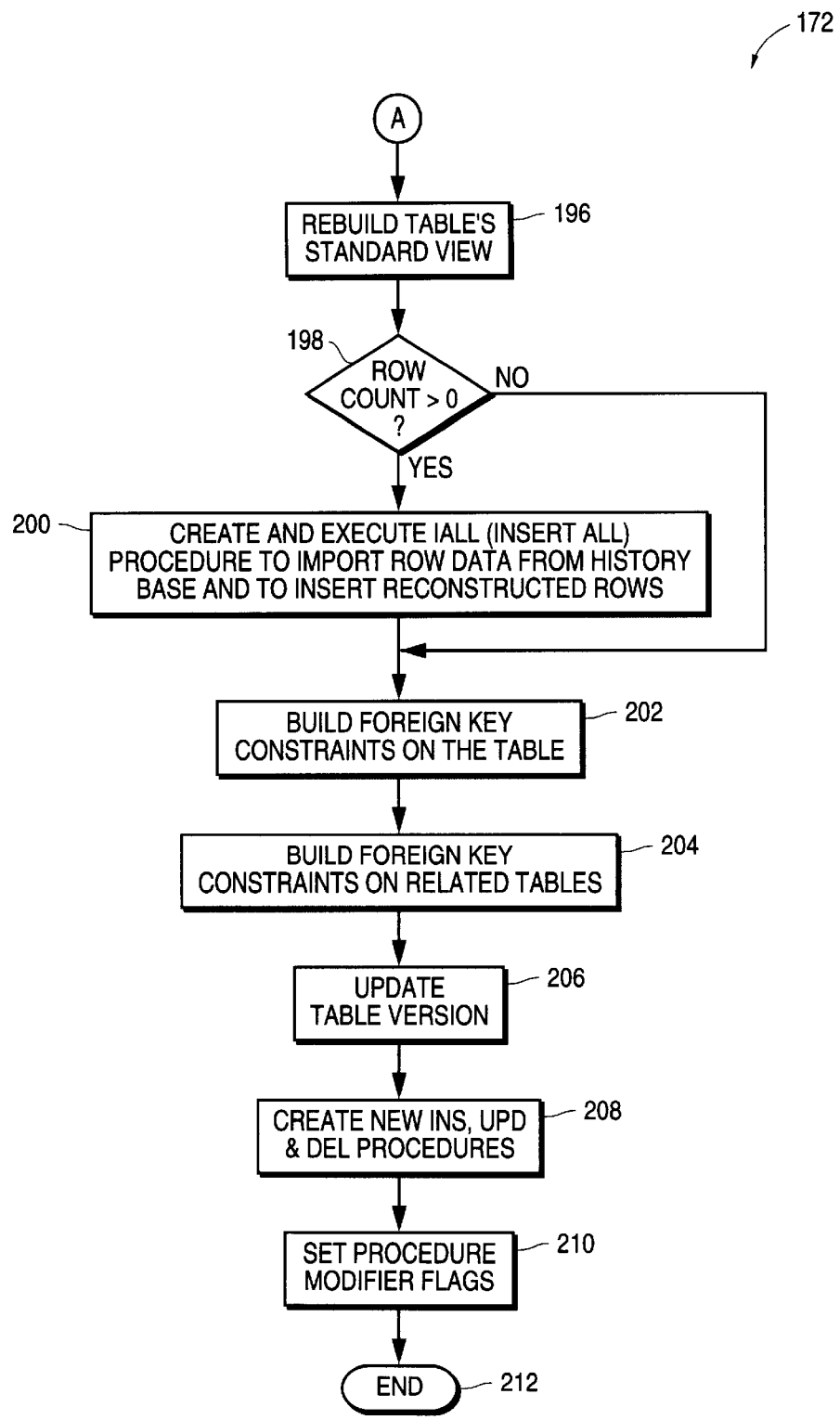

FIGS. 22A and 22B show a flow chart illustrating the sub-steps that comprise the table modification step 172 illustrated in FIG. 21. The step 172 is performed with respect to a single table (a "subject table"), and is iteratively performed with respect to each table that requires modification. After commencing at step 180, a transaction identifier is established for the modification operation to be performed on the subject table. At decision box 184, a row count with respect to the subject table is performed to determine whether the subject table in fact contains any records (i.e., rows). If the row count is greater than zero, indicating that at least one record is contained within the subject table, a "delete all" procedure is created and executed at step 186 to delete all rows from the subject table. Prior to actually deleting rows from the subject table, the "delete all" procedure will export data contained in such rows to the history base 20, which acts as a temporary repository for this information during modification of the subject table. Subsequent to this exporting of data from the rows, the "delete all" procedure will then delete all rows from the table. From step 186, the step 172 advances to step 188.

Alternatively, should it be determined at decision box 184 that there are in fact no rows within the table, the step 172 proceeds directly from the decision box 184 to step 188.

At step 188, foreign key constraints which are imposed upon related tables are removed. At step 190, the table is dropped from the generated database 18. If the database system 14 permits, dropping the table causes constraints on the table to also be removed. If the database system 14 does not permit this, these constraints on the table are first removed, and the table is then dropped. A new table is created at step 192 according to the modified definition contained in the metadata database 16. At step 194, unique key constraints for the new table are built, and the new table's standard view is then automatically re-built by the update logic 42 of the database system 14 at step 196. At decision box 198, a determination is again made as to whether the row count for the original subject table was greater than zero. If so, an "insert all" procedure is created and executed at step 200. Specifically, the "insert all" procedure retrieves the data exported at step 186 by the "delete all" procedure from the history base 20, recreates rows within the new table according to the modified metadata definition, and stores the imported data into respective rows. The step 172 then advances from step 200 to step 202.

Alternatively, should it be established at decision box 198 that no rows existed within the original subject table, the step 172 advances directly to step 202.

At step 202, foreign key constraints on the new table are again reconstructed. At step 204, foreign key constraints imposed by the new table on related tables are also reconstructed. At step 206, the table version is updated, and at step 208 new insert (INS), delete (DEL) and update (UPD) procedures are created. Regarding step 206, FIG. 12 illustrates at 110c that a version number is associated with each table. The TABLE_VERSIONS object 96 and TABLE_VERSION_COLUMNS object 98 are also updated at step 206. Details regarding modified, updated or deleted table, along with appropriate version numbers, may be stored in the history base 20 to provide an audit trail of table definitions.

At step 210, procedure modified flags are set for all stored procedures within the database which require modification as a result of the modification to the subject table. Specifically, modified flags are set for all procedure types listed in Table 1 (other than INS, DEL and UPD procedures that were generated at step 205) that require modification.

Figure 23:
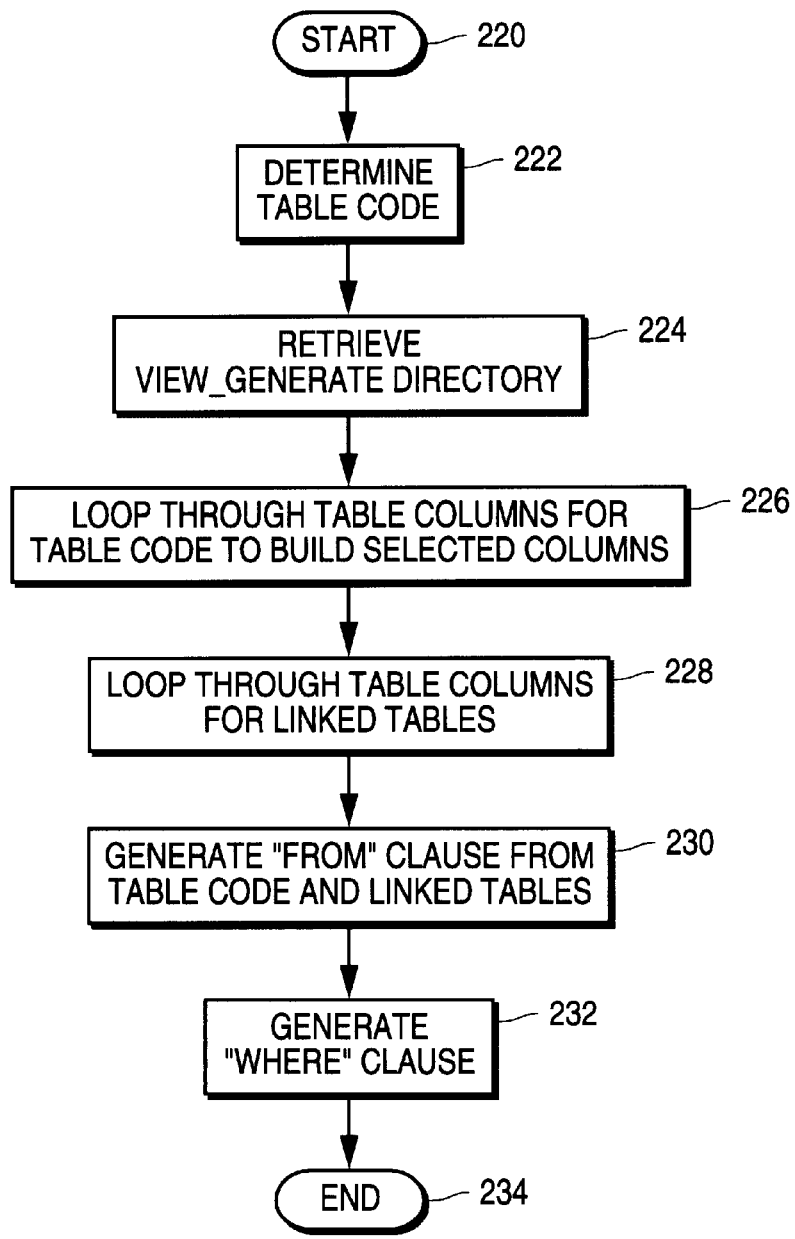
FIG. 23 is a flow chart showing the steps required to rebuild a standard view for a table, according to one embodiment of the present invention.

FIG. 23 is flow chart indicating the steps required to rebuild the standard view for a table. After commencing at step 220, a determination of the table code (as indicated at 110a in FIG. 12) is made. At step 224, a view_generate directory is retrieved. At step 226, the database system 14 loops through the table_columns rows for the table code determined at step 222 in order to build the selected columns. At step 228, the database system 14 loops through table columns object for linked tables, and then generates "from" and "where" clauses utilizing the table code and linked table information.

Figure 24:
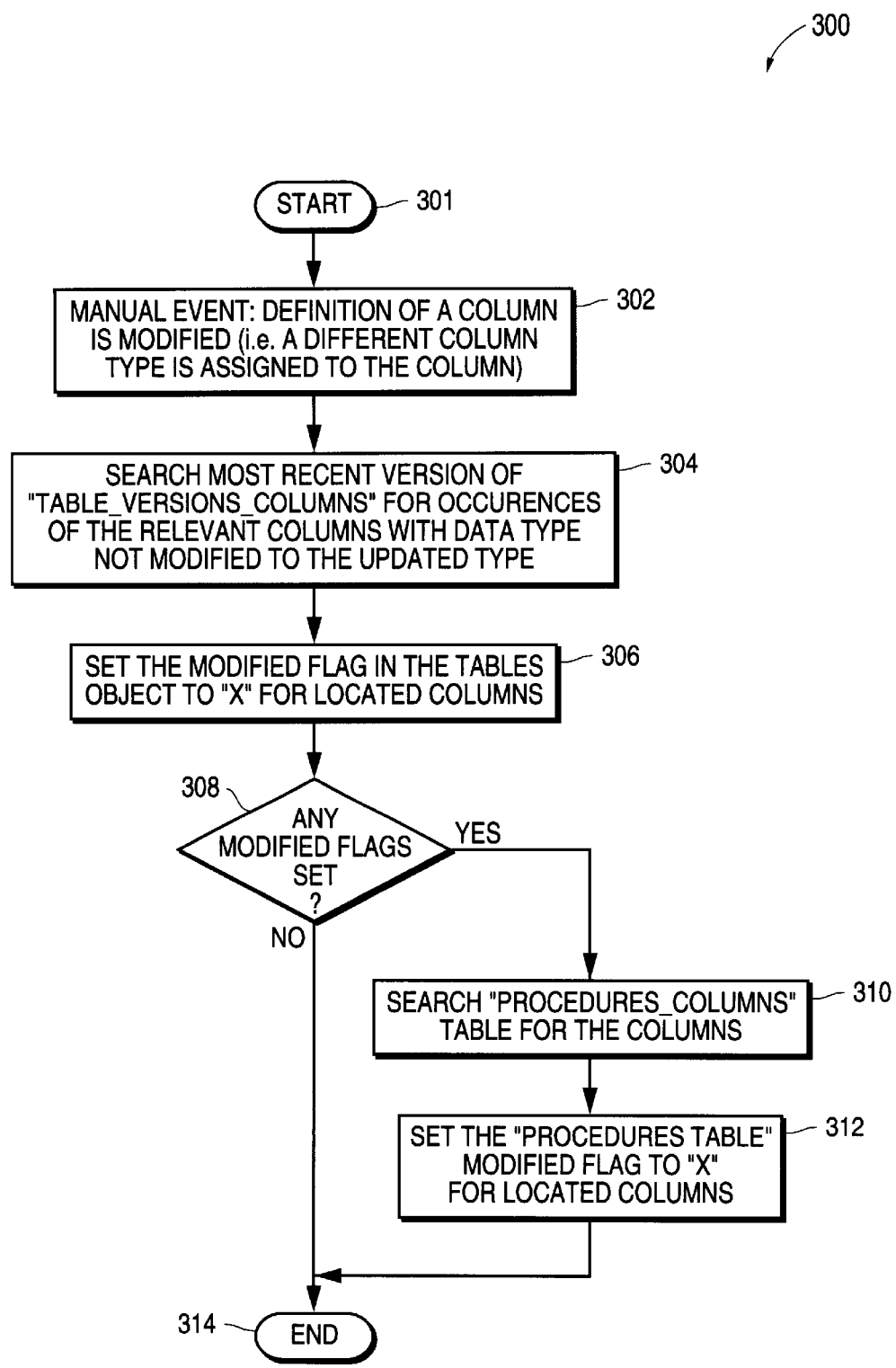
FIGS. 24–26 are flow charts showing the steps required to set modified flags for tables and procedures, according to one embodiment of the present invention.
Figure 25:
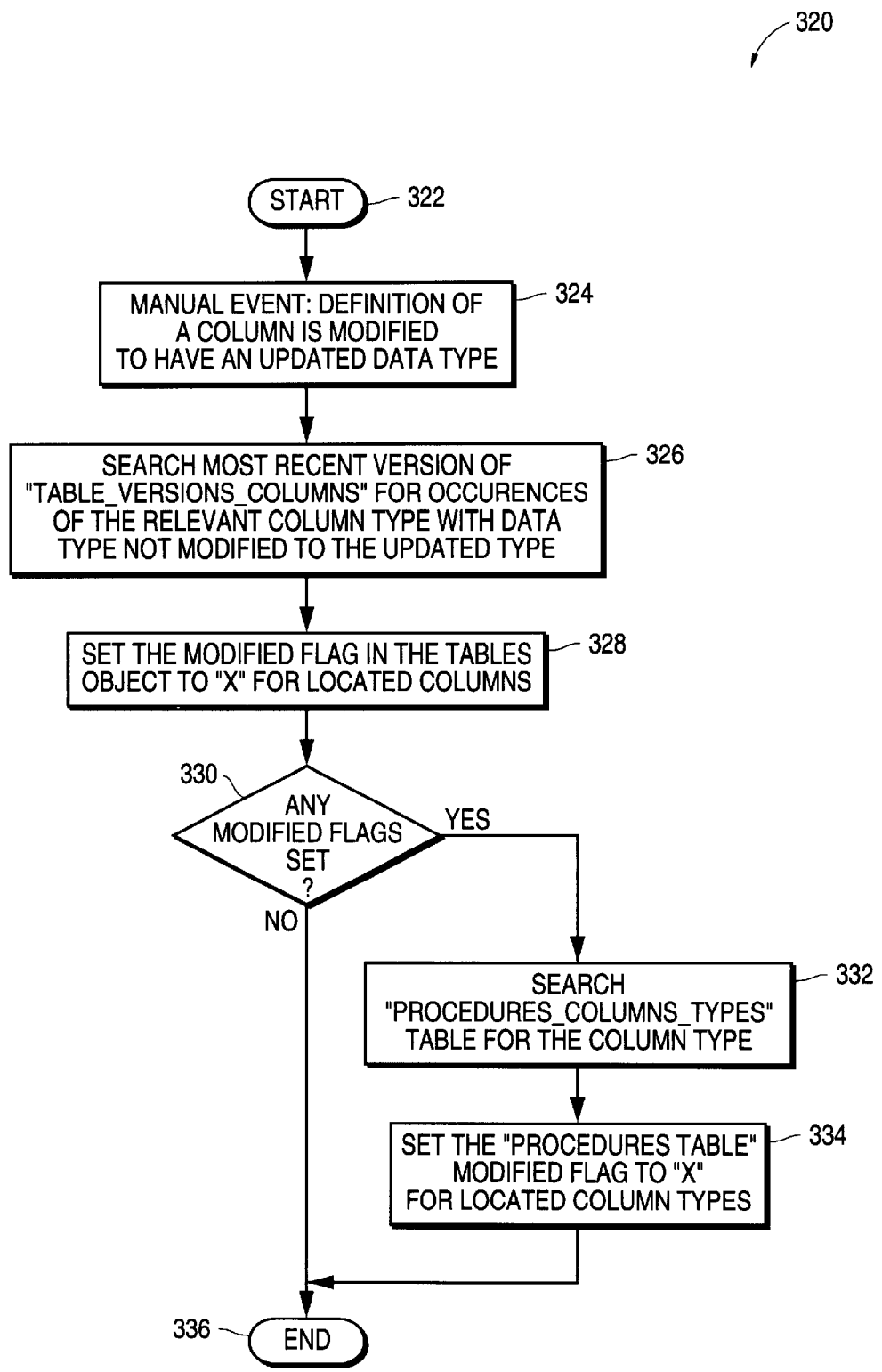
Figure 26:
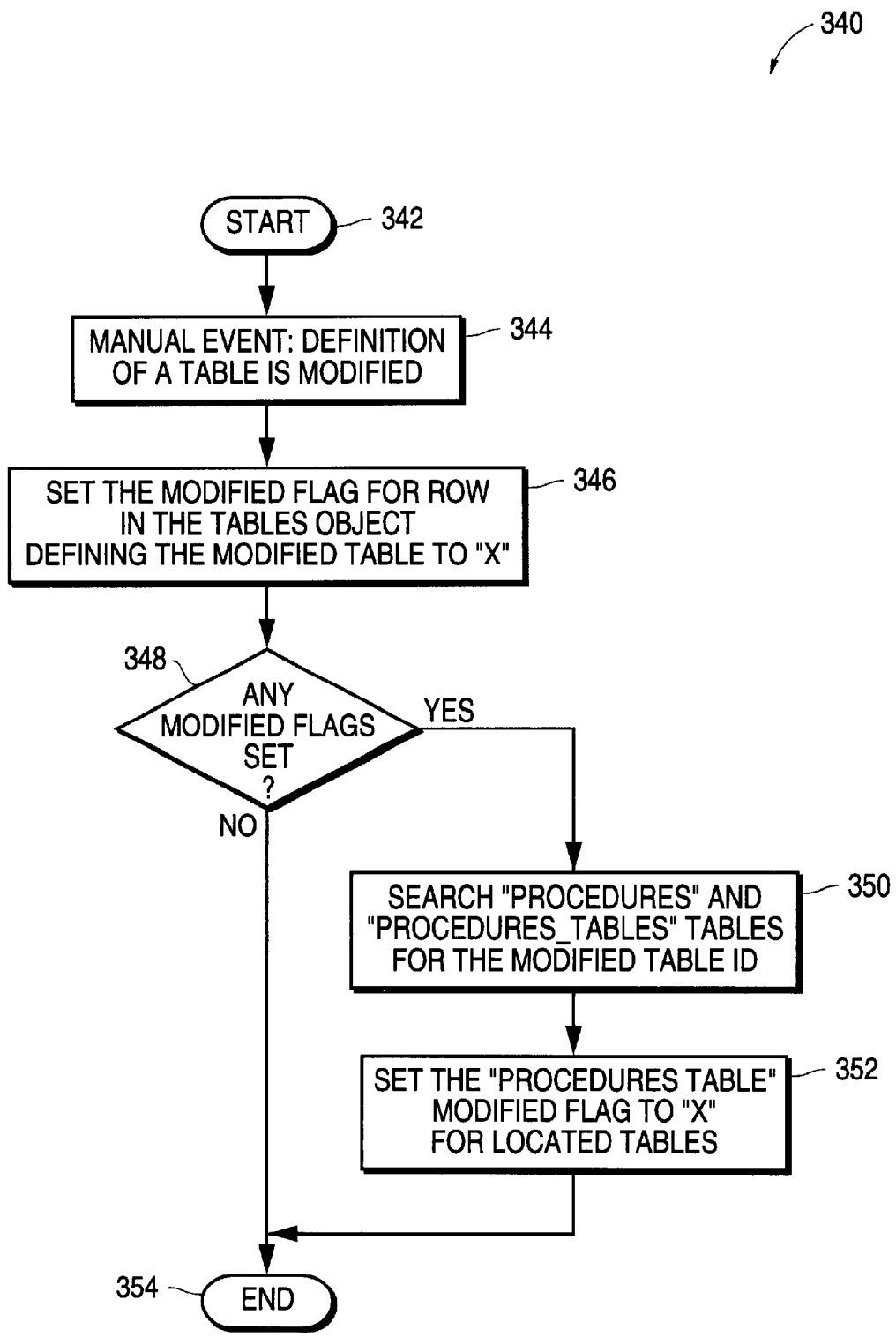

FIGS. 24–26 are flowcharts illustrating the steps according to one embodiment of the invention, for setting a modified flag for each column, column type and table affected by a modification indicated by the metadata database 16. Specifically, FIG. 24 lists the steps in a SET_MODIFIED_COLUMN procedure that sets modified flags for rows (or records) included within a TABLES object within a metadata database 16, in response to a different column type being assigned to a column. FIG. 25 illustrates the steps in a SET_MODIFIED_COLUMN_TYPE procedure that sets modified flags for affected rows within a TABLES object in response to the modification of a column type to have an updated data type. FIG. 26 illustrates the steps in a SET_MODIFIED_TABLE procedure that sets modified flags for rows within TABLES objects in response to a modification of the definition of a table in the metadata database 16.

Returning to FIG. 24, the procedure 300 commences in response to a manual event that occurs at step 302, where the definition of a column is modified by, for example, assigning a different column type to the relevant column. Steps 304–314 are then performed by the server 12 under direction of the database management algorithms 17, as illustrated in FIG. 4, that form part of the middleware of a software system according to the present invention. At step 304, the procedure 300 searches a TABLE_VERSION_COLUMNS table, such as that provided in FIG. 19B, for occurrences of the modified column with a data type indication not modified to reflect the modification made at step 302. If occurrences of the column within the TABLE_VERSION_COLUMNS table are encountered, a modified flag for the relevant row within a TABLES object is set.

At step 308, a determination is then made as to whether any modified flags within a relevant TABLE object have been set. If so, the procedure 300 proceeds to step 310 and a search of an associated PROCEDURES COLUMNS table is performed to locate appropriate columns. At step 312, the PROCEDURES TABLE modified flag is set for located columns. The procedure 300 then ends at step 314.

Referring to FIGS. 25 and 26, the steps of procedures of 320 and 340 correspond substantially to those of 300, and do not require further description.

Turning to FIGS. 27A and 27B, a procedure 360 of automatically modifying procedures within a database in accordance with modifications made to metadata is described. The procedure 360 corresponds to the step 160 of method 150 shown in FIG. 20, The procedure 360 commences at step 362, and then proceeds to step 364 where a TABLES object (i.e. a TABLES table) is searched for table rows that have a set modified flag. For example, referring to FIG. 5, the TABLES object 56 would be subject to this search. At decision box 366, a determination is made as to whether a INSERT_FLAG is set. If so, a new INSERT procedure for the relevant table is generated at step 368.

At decision box 370, a determination is made as to whether a UPDATE_FLAG for a relevant row in the TABLES object is set. If so, a new UPDATE procedure is generated at step 370.

At decision box 374, a determination is made as to whether a DELETE_FLAG is set for the relevant row within the TABLES object. If so, a new DELETE procedure is generated for the relevant row at step 376. At step 374, the modified flag for the relevant row within the TABLES object is reset or nulled.

Returning now to FIG. 27B, at steps 380, 386, 392 and 398, searches of the PROCEDURES object 86 for records including a set modified flag, and having the procedure types shown in FIG. 27B, are conducted. If such records are located, appropriated new procedures are created, and the relevant modified flags are set to null, at steps 384, 390 and 396. It will however be noted at step 402, in response to the determination in step 398, a procedure is executed that parses the program looking for, and modifying, local variables and their data types according to the COLUMN or COLUMN TYPE and also changing inconsistent data types.

Figure 28:
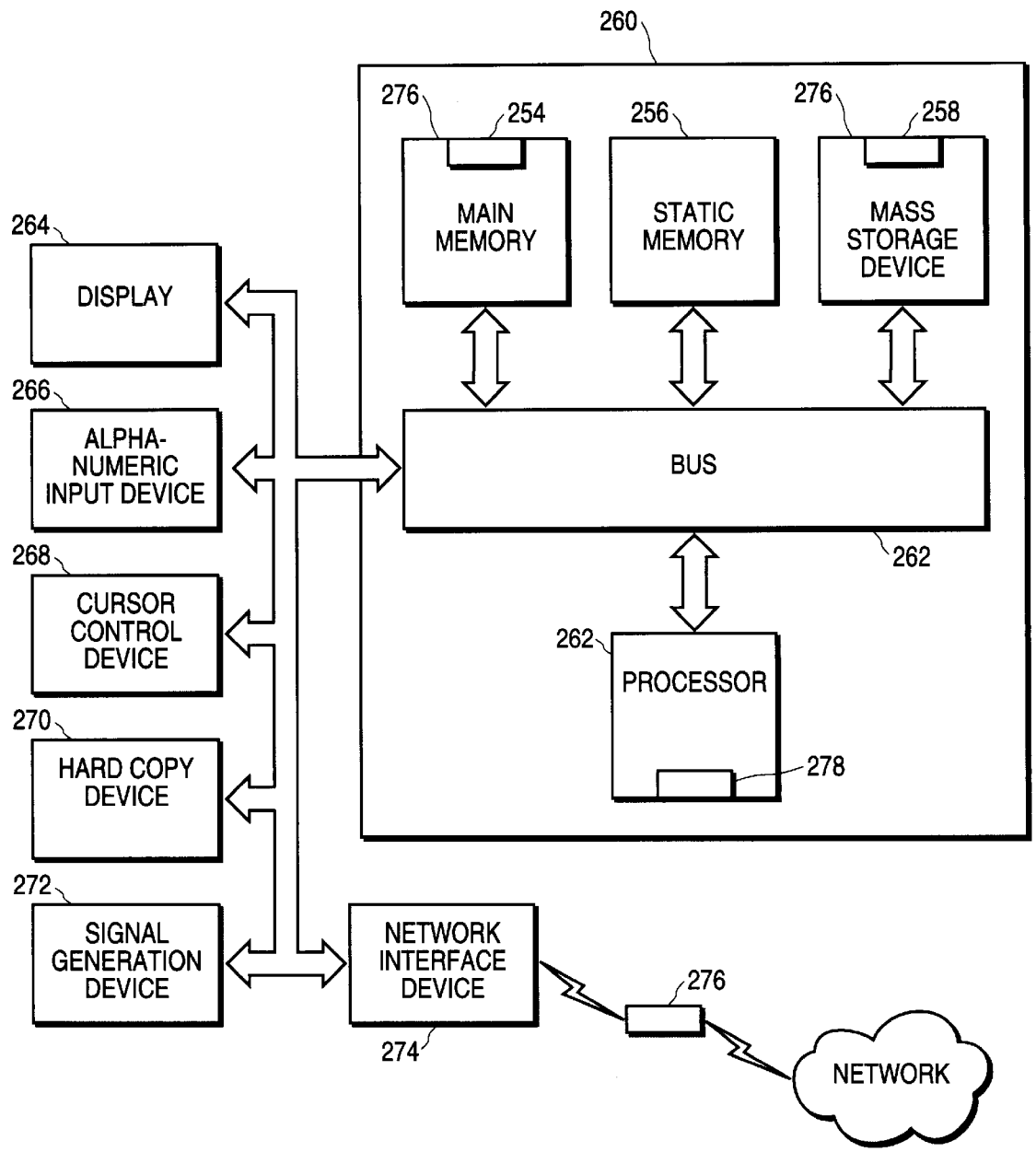
FIG. 28 is a block diagram illustrating an exemplary computer system within which the present invention may be implemented.

FIG. 28 is a diagrammatic representation of a computer system 250 which may host the server 12, or any of the clients 22, 26 or 30 shown in FIG. 1. The computer system 250 includes a processor 252, a main memory 254, a static memory 256 and a mass storage device 258, each of which is typically included within a housing 260, and coupled to a bus 262. External to the housing 260, and also coupled to the bus 262 are a display device 264, such as a Cathode Ray Tube (CRT) or an Liquid Crystal Display (LCD) unit; an alpha-numeric input device 266, such as a keyboard; a cursor control device 268, such as a mouse; a hard copy device 270, such as a printer; and a signal generation device 272, such as a microphone or speaker. The computer system 250 also includes a network interface device 274 which is also coupled to the bus 262. For the purposes of the specification, the term "computer-readable medium" shall be taken to include any media that may be utilized for the storage of a sequence of instructions for execution by the processor 252. In one embodiment of the present invention, the mass storage device 258 comprises a hard-disk drive unit, including a magnetic disk and the main memory 254 may be a Random Access Memory (RAM). The network interface device 274 may be coupled to a network (e.g., via an internet or the Internet), and has the capability to transmit and receive signals via the network. Accordingly, for the purposes of the specification, the term "computer-readable medium" shall be taken to include a magnetic disk included within the mass storage device 258, RAM, or a signal transmitted or received by the network interface device 274. The present invention extends to any computer-readable medium, as defined above, storing a sequence of instructions which, when executed by the processor 252, cause the processor 252 to perform the steps illustrated in any one of the flow charts of FIGS. 20–27B. A program 276 comprising such a sequence of instructions is shown to be resident, wholly or at least partially, in the main memory 254, the mass storage device 258 and the processor 252. The program 276 is also shown to be transmitting to (or from) the network interface device 274.

Thus, a method of modifying a database structure by modifying metadata describing that database structure has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
modifying metadata describing a structure of an existing database object in a populated database including setting a modified flag of a database object associated with the existing database object and identifying dependencies among a plurality of database objects effected by the modification;
automatically modifying the structure of the populated database to conform to the modified metadata, by using the modified metadata to automatically create a new database object having a database object structure described by the modified metadata; and
storing data associated with the existing database object in the new database object.

2. The method of claim 1 wherein the modifying of the metadata comprises modifying a description of the existing database object characteristic in a metadata object.

3. The method of claim 1 wherein the modifying of the metadata comprises one or more of deleting, inserting and modifying a relationship description in a metadata object.

4. The method of claim 1 wherein the modifying of the metadata comprises modifying a description of the existing database object structure in a metadata object.

5. The method of claim 4 wherein the modifying of the metadata comprises one or more of deleting, inserting a modifying a description in a metadata object of columns included in a database table.

6. The method of claim 1 wherein the modifying of the metadata comprises comparing version information, within the metadata, for a database table and columns included therein.

7. The method of claim 1 wherein the automatically modifying the structure of the populated database comprises setting dependencies for a plurality of database objects effected by the modification to the metadata.

8. The method of claim 1, wherein the existing database object comprises an existing database table, and wherein the automatically modifying the structure of the populated database includes:
exporting all data from the existing database table to a storage location; and
deleting all rows of the existing database table.

9. The method of claim 8 wherein the automatically modifying the structure of the populated database includes removing a foreign key constraint on a related table imposed by the existing database table.

10. The method of claim 8 wherein the automatically modifying the structure of the populated database includes:
dropping the existing database table from the database.

11. The method of claim 10 wherein the automatically modifying the structure of the populated database includes automatically generating a unique key constraint for the new database object.

12. The method of claim 10 wherein the automatically modifying the structure of the populated database includes automatically generating a replacement view associated with the new database object.

13. The method of claim 10 wherein the automatically modifying the structure of the populated database includes automatically generating a foreign key constraint on related tables for the new database object.

14. The method of claim 10 wherein the automatically modifying the structure of the populated database includes automatically generating at least one procedure associated with the new database object.

15. The method of claim 14 wherein the at least one procedure comprises an insert, delete or update procedure.

16. An apparatus comprising:
    means for modifying metadata describing a structure of a populated database including setting a modified flag of a database object associated with the populated database;
    means for setting dependencies for one or more database objects effected by the modification to the metadata; and
    means for automatically modifying the structure of the populated database to conform to the modified metadata.

17. The apparatus of claim 16 wherein the means for modifying the metadata comprises means for modifying a description of a database object characteristic in a metadata object.

18. The apparatus of claim 16 wherein the means for modifying the metadata comprises means for deleting, inserting or modifying a relationship description in a metadata object.

19. The apparatus of claim 16 wherein the means for modifying the metadata comprises means for modifying a description of a database object structure in a metadata object.

20. A method comprising:
    ascertaining a modification made by a user to metadata describing a structure of an existing database object in a populated database;
    automatically modifying the structure of the populated database to conform to the modified metadata, by using the modified metadata to automatically create a new database object having a database object structure described by the modified metadata; and
    storing data associated with the existing database object in the new database object.

21. The method of claim 20 wherein the ascertaining a modification comprises ascertaining a modification to a description of a database object characteristic in a metadata object.

22. The method of claim 20 wherein the ascertaining a modification comprises ascertaining a deletion, insertion, or modification of a relationship description in a metadata object.

23. The method of claim 20 wherein the ascertaining a modification comprises ascertaining a modification to a description of a database object structure in a metadata object.

24. A computer system comprising:
    a processor; and
    a memory coupled with the processor to store a populated database having a database structure;
    the processor to modify metadata describing the database structure in response to a user input and to automatically modify the database structure to conform to the modified metadata, by using the modified metadata to automatically create a new database object having a database object structure described by the modified data, and the processor to store data associated with the existing database object in the new database object.

25. A computer-readable medium having instructions stored thereon that, when executed by a computer, cause the computer to:
    modify metadata describing a structure of an existing database object in a populated database including setting a modified flag of a database object associated with the existing database object and identifying dependencies among a plurality of database objects effected by the modification;
    automatically modify the structure of the existing database object in the populated database to conform to the modified metadata, by using the modified metadata to automatically create a new database object having a database object structure described by the modified metadata; and
    store data associated with the existing database object in the new database object.

26. A method comprising:
    providing a database including a first existing table having structured data;
    modifying metadata that describes the structure of at least a subset of the data from the first existing table including setting a modified flag of a database object associated with the first existing table and identifying dependencies among a plurality of database objects effected by the modification;
    using the modified metadata to create a second new table having a structure consistent with the modified metadata;
    importing data associated with the first existing table into the second new table.

27. The method of claim 26, wherein modifying metadata includes using a user interface to modify metadata.

28. The method of claim 26, wherein using the modified metadata to create a second new table is performed substantially automatically after modifying the metadata.

29. The method of claim 26, further comprising exporting the data contained in the first existing table to a temporary repository memory, and wherein importing data comprises importing the data from the temporary repository memory.

30. The method of claim 29, further comprising dropping the first existing table from the database after exporting the data to the temporary repository memory.

31. The method of claim 26, further comprising after modifying metadata examining metadata objects and setting a modified flag for at least one metadata object that is affected by the modified metadata.

32. The method of claim 26, wherein the database includes a third existing table that is dependent upon the first existing table, the method further comprising establishing a dependency sequence that indicates that a new table corresponding to the first existing table is to be created before a new table corresponding to the third existing table is to be created.

33. The method of claim 26 wherein modifying metadata includes modifying metadata that is provided as at least one table containing at least one row and at least one column.

34. The method of claim 26, further comprising using the modified metadata and existing update logic to modify code segments corresponding to software procedures that perform functions related to the database according to the modified metadata.

35. A method of modifying a database structure comprising:
　　modifying metadata that describes the database structure; and
　　setting dependencies for one or more database objects effected by the modification to the metadata; and
　　automatically modifying the one or more database objects to conform to the modified metadata.

36. The method of claim 35, wherein the one or more database objects include one or more table objects.

37. The method of claim 35, wherein the one or more database objects include one or more stored procedure objects.

38. The method of claim 35, wherein the one or more database objects include one or more view objects.

39. The method of claim 35 wherein said modifying metadata comprises modifying a description of a database object characteristic.

40. A method of modifying one or more table objects in a database, the method comprising the steps of:
　　a step for modifying metadata that describes the structure of the one or more table objects including setting a modified flag of an object associated with the one or more table objects;
　　a step for setting dependencies for the one or more table objects effected by the modification to the metadata; and
　　step for modifying the one or more table objects in response to said modifying metadata to conform them to the modified metadata.

41. The method of claim 40 wherein the step for modifying the table object in the database comprises:
　　a step for using the modified metadata to create a modified version of the table object having a structure consistent with the modified metadata.

42. An apparatus comprising:
　　means for modifying metadata describing a structure of a database including setting a modified flag of a database object associated with the database;
　　means for setting dependencies for one or more database objects effected by the modification to the metadata; and
　　means for modifying the one or more database objects to conform to the modified metadata.

43. The apparatus of claim 42 wherein the means for modifying metadata describing a structure of a database comprises a means for modifying a description of the existing database object characteristic in a metadata object.

44. A method of modifying the structure of a first database comprising:
　　a. modifying metadata in a second database that describes the structure of the first database;
　　b. setting a modified flag for each object in the second database effected by said modifying metadata;
　　c. setting a dependency sequence for one or more tables contained in the first database effected by the modification to the metadata;
　　d. exporting data from the first table in the dependency sequence;
　　e. removing foreign key constraints from the first table;
　　f. dropping the first table from the first database;
　　g. using the modified metadata to create a modified version of the first table having a structure consistent with the modified metadata;
　　h. importing data associated with the first table into the modified version of the first table;
　　i. creating foreign key constraints for the modified version of the first table; and
　　j. repeating steps d–i for the remaining tables in the dependency sequence.

45. The method of claim 44 wherein the modifying metadata in a second database comprises modifying a description of an existing database object characteristic in a metadata object.

46. The method of claim 44 wherein the modifying metadata in a second database comprises one or more of deleting, inserting, and/or modifying a relationship description in a metadata object.

47. The method of claim 44 wherein the modifying metadata in a second database comprises one or more of deleting, inserting, and/or modifying a description in a metadata object of columns included in a table in the first database.

48. A method of modifying the structure of a first database comprising:
　　modifying metadata in a second database that describes the structure of the first database including setting a modified flag in the second database that is associated with a database object of the first database;
　　determining database objects in the first database effected by said modifying metadata;
　　identifying dependencies among the effected database objects; and
　　using the modified metadata and the dependencies to modify the effected database objects to conform with a structure described by the modified metadata.

49. The method of claim 48 wherein the effected database objects comprise one or more table objects, view objects, and/or stored procedure objects.

50. The method of claim 48 wherein the modifying metadata in a second database comprises one or more of deleting, inserting, and/or modifying a description in a metadata object of columns included in a table in the first database.

* * * * *

UNITED STATES PATENT AND TRADEMARK OFFICE
CERTIFICATE OF CORRECTION

| | |
|---|---|
| PATENT NO. | : 6,366,917 B1 |
| APPLICATION NO. | : 09/053876 |
| DATED | : April 2, 2002 |
| INVENTOR(S) | : St. John Herbert, III |

It is certified that error appears in the above-identified patent and that said Letters Patent is hereby corrected as shown below:

In column 2, line 1, delete "structural".

In column 2, line 15, delete "FIG. 9" and insert --FIGS. 9A and 9B--.

In column 2, line 19, delete "FIG. 11" and insert --FIGS. 11A and 11B--.

In column 2, line 24, delete "FIG. 13" and insert --FIGS. 13A and 13B--.

In column 4, line 24, delete "having number" and insert --having a number--.

In column 8, lines 44-45, delete "FIG. 9" and insert --FIGS. 9A and 9B--.

In column 8, line 57, delete "FIG. 11 illustrates" and insert --FIGS. 11A and 11B illustrate--.

In column 8, line 63, delete "FIG. 13 illustrates" and insert --FIGS. 13A and 13B illustrate--.

Signed and Sealed this

Twenty-ninth Day of January, 2008

JON W. DUDAS
*Director of the United States Patent and Trademark Office*